United States Patent
Fujita et al.

(10) Patent No.: US 6,909,513 B1
(45) Date of Patent: Jun. 21, 2005

(54) SHAPE MEASURING DEVICE

(75) Inventors: Hideto Fujita, Yao (JP); Hiroaki Yoshida, Takatsuki (JP); Hiroshi Kano, Kyotanabe (JP); Shimpei Fukumoto, Nara (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/926,601

(22) PCT Filed: May 24, 2000

(86) PCT No.: PCT/JP00/03332

§ 371 (c)(1),
(2), (4) Date: Nov. 26, 2001

(87) PCT Pub. No.: WO00/73738

PCT Pub. Date: Dec. 7, 2000

(30) Foreign Application Priority Data

May 26, 1999 (JP) ............................................ 11/146904

(51) Int. Cl.⁷ .............................................. G01B 11/24

(52) U.S. Cl. ..................... 356/601; 33/3 R; 12/142 R

(58) Field of Search ................................ 356/601–613, 356/2; 12/1 R, 142 R, 142 N, 142 M; 33/3 R–3 C; 382/154

(56) References Cited

U.S. PATENT DOCUMENTS

| | | | | |
|---|---|---|---|---|
| 3,994,563 A | * | 11/1976 | Barsai et al. | 359/471 |
| 5,198,877 A | * | 3/1993 | Schulz | 356/614 |
| 5,376,796 A | * | 12/1994 | Chan et al. | 250/363.04 |
| 5,612,905 A | | 3/1997 | Maillart et al. | |
| 6,064,749 A | * | 5/2000 | Hirota et al. | 382/103 |
| 6,069,700 A | | 5/2000 | Rudnick et al. | |

FOREIGN PATENT DOCUMENTS

| | | |
|---|---|---|
| JP | 58-206909 | 12/1983 |
| JP | 5-141930 | 6/1993 |
| JP | 5-280955 | 10/1993 |
| JP | 5-302823 | 11/1993 |
| JP | 08-101032 | 4/1996 |
| JP | 09-014930 | 1/1997 |
| JP | 09-128549 | 5/1997 |

(Continued)

OTHER PUBLICATIONS

Agui et al., "3–D Object Data Input System Using Rear–View Mirrors", Institute of Electronics, Information, Communication Engineers, Journal D, vol. J70–D, No. 5, pp. 995–1002, May 25, 1987.

Tamura et al., "Occlusion–Free 3D Recovery Using Mirror Images", Technological Research Report of Institute of Electronics, Information and Communication Engineers (PRU87–78), vol. 87, No. 333, pp. 9–16, Jan. 21, 1988.

Yoshida et al., "Hand–held 3D Scanner Using Two–stage Active Stereo Method", Preprints of Third Applied Signal Processing Symposium, System Control Information Institute, pp. 1–4, Feb. 3, 2000.

Notice of Rejection for Japanese Patent Application No. JP 2000–146146, dated Jan. 16, 2004.

*Instrumentation System for Developing Sporting Gears*, Measurement and Control magazine (pp. 285–288).

Primary Examiner—Richard A. Rosenberger
Assistant Examiner—Vincent P. Barth
(74) Attorney, Agent, or Firm—Arent Fox, PLLC

(57) ABSTRACT

There are provided a measuring head moved along a guide rail, first position detection means for detecting the positions of the measuring head on the guide rail using a predetermined position on the guide rail as a reference position, second position detection means for detecting the position in a world coordinate system of the measuring head on the guide rail, and means for storing in a storage device each of the positions of the measuring head on the guide rail using the predetermined position on the guide rail as the reference position and a corresponding position in the world coordinate system with the positions correlated with each other.

12 Claims, 19 Drawing Sheets

FOREIGN PATENT DOCUMENTS

| | | |
|---|---|---|
| JP | 10-124704 | 5/1998 |
| JP | 11-083452 | 3/1999 |
| JP | 11-101623 | 4/1999 |
| JP | A-2000-39310 | 2/2000 |
| JP | 2000-065548 A | 3/2000 |

* cited by examiner

SHAPE MEASURING DEVICE

TECHNICAL FIELD

The present invention relates to a shape measuring device for measuring a three-dimensional shape, and more particularly, to a shape measuring device suitable for measurement of the shape of a foot.

BACKGROUND ART

Generally, the size of shoes is represented by the length from the heels to the fingertips. However, the shapes of a human foot, for example, not only the foot length but also the height of the instep, the foot breadth, and so on, are of various types depending on individuals. When an attempt to make shoes corresponding to the shape of the foot of each person is made, it is necessary to measure the three-dimensional shape of the foot. In the present condition, however, the sizes of limited portions, for example, the foot length, the foot breadth, and the perimeter of the foot are only measured using a measure.

On the other hand, an active stereo type shape measuring device for irradiating an object to be measured with spot light or slit light and restoring a three-dimensional shape from the position of a light image observed on a surface of the object to be measured has been known. The shape measuring device is for scanning the spot light or the slit light using a rotating mirror in order to measure the shape of the surface of the object to be measured. In a magazine "Measurement and Control" (1999 Vol. 38 No. 4 P285–P288), a system for measuring the shape of a foot using such a shape measuring device is described.

In the system, one shape measuring device can measure only the shape of a portion observed from the device and cannot measure the shape of a concealed portion on the opposite side of the observed portion, for example. Accordingly, 12 shape measuring devices are disposed around the foot, and the results of the measurement by the 12 shape measuring devices are synthesized on a computer, to measure the shape of the whole foot.

In the system, however, the plurality of shape measuring devices are arranged around the foot, so that the system increases in size and in cost. Moreover, it is difficult to synthesize the results of the measurement by the plurality of shape measuring devices with high precision.

Contrary to this, the applicant of the present invention has already developed a shape measuring device for making measurement by holding a compact measuring head in a person's hand and moving the measuring head around an object to be measured (see JP-A-2000-39310). In the shape measuring device, a plurality of markers attached to the measuring head are imaged from above by two cameras to measure the position and the direction of the measuring head.

In this proposal, it is necessary to image the whole of the moving range of the measuring head from the two cameras positioned above. Accordingly, the two cameras are set up at positions spaced apart from the object to be measured in order to widen a field of view common to the cameras, resulting in the necessity of a large setup space. Further, when a part of the marker attached to the measuring head is depart from the field of view common to the two cameras and is concealed by the hand of a measuring person who holds the object to be measured and the measuring head, the shape of the object to be measured cannot be measured. Accordingly, it has been tedious for the measuring person to pay attention to the marker attached to the measuring head such that the marker is always imaged by the two cameras.

An object of the present invention is to provide a shape measuring device capable of measuring the shape of an object to be measured without a user being conscious of a field of view of a camera to improve the feeling of use.

Another object of the present invention is to provide a shape measuring device capable of measuring a suitable three-dimensional shape in a small number of procedures for measurement.

DISCLOSURE OF INVENTION

A first shape measuring device according to the present invention is characterized by comprising a measuring head moved along a guide rail; first position detection means for detecting the positions of the measuring head on the guide rail using a predetermined position on the guide rail as a reference position; second position detection means for detecting the position in a world coordinate system of the measuring head on the guide rail; means for storing in a storage device each of the positions of the measuring head on the guide rail using the predetermined position on the guide rail as the reference position and a corresponding position in the world coordinate system with the positions correlated with each other; measurement means for detecting the position of the measuring head by the first position detection means at each of measuring positions on the guide rail as well as finding the coordinates in a measuring head coordinate system of a measuring point on an object to be measured using the measuring head; and means for converting the coordinates in the measuring head coordinate system of the measuring point on the object to be measured, which are found at each of the measuring position on the guide rail, into coordinates in the world coordinate system on the basis of a position in the world coordinate system, corresponding to each of the measuring positions on the guide rail, which is stored in the storage device.

When the movement of the measuring head is limited to a track on the guide rail, each of the positions of the measuring head on the guide rail using the predetermined position on the guide rail as the reference position and the position in the world coordinate system of the measuring head are uniquely correlated with each other. If each of the positions of the measuring head on the guide rail using the predetermined position on the guide rail as the reference position and the corresponding position in the world coordinate system are stored in the storage device with the positions correlated with each other, therefore, it is possible to read out the position, in the world coordinate system of the measuring head, corresponding to the position of the measuring head on the guide rail using the predetermined position on the guide rail as the reference position from the storage device in measuring the shape, to convert the coordinates in the measuring head coordinate system of the measuring point found using the measuring head into the coordinates in the world coordinate system. The shape of the object to be measured can be measured by circulating the measuring head along the guide rail.

An example of the measuring head is one comprising light irradiation means for irradiating the object to be measured with a light flux, and imaging means for imaging the measuring point on the object to be measured which is irradiated with the light flux from the light irradiation means.

It is preferable that the measuring head comprises driving means for being moved along the guide rail.

An example of the second position detection means is one comprising measuring head imaging means for imaging the measuring head from the predetermined position, and means for detecting the position in the world coordinate system of the measuring head on the basis of an image obtained by the imaging in the measuring head imaging means.

Furthermore, the position in the world coordinate system of the measuring head is measured by the measuring head imaging means. Accordingly, the shape of the guide rail is not limited to a simple shape such as a straight line or a circle. For example, it can be changed into a free shape.

It is preferable that the measuring head imaging means is constructed so as to be attachable and detachable to and from the main body of the shape measuring device. This makes it possible to detach the measuring head imaging means from the main body of the shape measuring device in measuring the shape of the object to be measured.

It is preferable that the measuring head comprises driving means for being moved along the guide rail. This makes it possible to make the measuring head automatically travel along the guide rail. Accordingly, the shape of the object to be measured can be automatically measured.

An example of the guide rail is one taking such a shape that the distance thereof from the object to be measured is approximately constant. When such a guide rail is used, the measuring head moves while keeping the distance thereof from the object to be measured approximately constant, thereby making it possible to make a measuring error depending on the distance between the object to be measured and the measuring head uniform.

When the object to be measured is a human foot, usable as the guide rail is one taking an oblong shape having a long axis in a direction from the heel to the tiptoe of the foot. When such a guide rail is used, the measuring head moves while keeping the distance thereof from the foot approximately constant, thereby making it possible to make a measuring error depending on the distance between the foot serving as the object to be measured and the measuring head uniform.

Used as the guide rail may be one taking a shape tapered from the tiptoe to the heel of the foot. When such a guide rail is used, the measuring head moves along the shape of the foot tapered from the tiptoe toward the heel, thereby making it possible to make a measuring error depending on the distance between the object to be measured and the measuring head uniform.

A second shape measuring device according to the present invention is a shape measuring device comprising a measuring head for measuring the shape of an object to be measured which is placed on a measuring stand, position detection means for detecting the position of the measuring head, and operation means for finding a three-dimensional shape of the object to be measured on the basis of outputs of the measuring head and the position detection means, which is characterized in that a mirror for reflecting the object to be measured is disposed on the measuring stand.

An example of the position detection means is one for detecting the position of the measuring head by a stereo method using two cameras.

An example of the measuring head is one comprising light irradiation means for irradiating the object to be measured with a light flux, and imaging means for imaging a measuring point on the object to be measured which is irradiated with the light flux from the light irradiation means, to pick up a real image of the object to be measured and a virtual image of the object to be measured which is reflected on the mirror.

An example of the mirror is one having a light reflective surface formed on its surface. In this case, an example of the operation means is one comprising first means for finding the coordinates in a measuring head coordinate system of each of the measuring points on the basis of the coordinates of the measuring point on an imaging screen of the imaging means and an equation expressing a plane representing the light flux emitted from the light irradiation means, second means for converting the coordinates of each of the measuring points which are found by the first means into coordinates in a world coordinate system on the basis of the results of the detection by the position detection means, to find a three-dimensional shape corresponding to the rear image of the object to be measured and a three-dimensional shape corresponding to the virtual image of the object to be measured which is reflected on the mirror, third means for finding an equation, in the world coordinate system, expressing a light reflective surface of the mirror, fourth means for finding a three-dimensional shape which is symmetrical to the three-dimensional shape corresponding to the virtual image about the light reflective surface on the basis of the equation expressing the light reflective surface of the mirror, and fifth means for synthesizing the three-dimensional shape which is symmetrical to the three-dimensional shape corresponding to the virtual image about the light reflective surface and the three-dimensional shape corresponding to the real image of the object to be measured, to find a three-dimensional shape of the object to be measured.

An example of means for finding the equation expressing the light reflective surface of the mirror is one comprising means for measuring the coordinates of three or more points on the light reflective surface by a stereo method using two cameras, and means for finding an equation expressing the light reflective surface on the basis of the obtained coordinates of the three or more points on the light reflective surface.

An example of means for finding the equation expressing the light reflective surface of the mirror is one comprising means for imaging an opaque thin plate using the measuring head in a state where the thin plate is placed on the light reflective surface, to extract coordinates in the measuring head coordinate system of three or more points for specifying a plane of the thin plate, means for converting the obtained coordinates in the measuring head coordinate system of the three or more points into coordinates in the world coordinate system on the basis of the results of the detection by the position detection means, and means for finding an equation, in the world coordinate system, expressing the plane of the thin plate on the basis of the obtained coordinates in the world coordinate system of the three or more points.

It is preferable that there is provided guide means for regulating the posture of the measuring head such that the light flux irradiated from the light irradiation means in the measuring head is perpendicularly emitted to the light reflective surface of the mirror. It is preferable that the guide means regulates a moving path of the measuring head. It is preferable that there is provided driving means for moving the measuring head along the guide means.

There may be provided a case covering the whole of the moving path of the measuring head. The case may comprise an opening into and from which the object to be measured is to be inserted and extracted. A cover composed of an elastic member may be provided in the opening of the case, and a notch into and from which the object to be measured is to be inserted and extracted may be formed in the cover.

Used as the mirror may be one comprising a light reflecting plate having a light reflective surface formed on its surface and a transparent plate formed on the light reflecting plate. In this case, an example of the operation means is one comprising first means for finding, with respect to a measuring point on the real image of the object to be measured, the coordinates in the measuring head coordinate system of the measuring point on the basis of the coordinates of the measuring point on the imaging screen of the imaging means and the equation expressing the plane representing the light flux emitted from the light irradiation means, second means for finding, with respect to a measuring point on the virtual image of the object to be measured which is reflected on the mirror, the coordinates in the measuring head coordinate system of the measuring point on the basis of a coordinate value obtained by correcting the coordinate value of the measuring point on the imaging screen of the imaging means in consideration of the amount of refraction of the transparent plate in the mirror and an equation obtained by correcting the equation expressing the plane representing the light flux emitted from the light irradiation means in consideration of the amount of refraction of the transparent plate in the mirror, third means for converting the coordinates of each of the measuring points which are found by the first means and the second means into coordinates in the world coordinate system on the basis of the results of the detection by the position detection means, to find a three-dimensional shape corresponding to the real image of the object to the measured and a three-dimensional shape corresponding to the virtual image of the object to be measured which is reflected on the mirror, fourth means for finding an equation, in the world coordinate system, expressing the light reflective surface of the mirror, fifth means for finding a three-dimensional shape which is symmetrical to the three-dimensional shape corresponding to the virtual image about the light reflective surface on the basis of the equation expressing the light reflective surface of the mirror, and sixth means for synthesizing the three-dimensional shape which is symmetrical to the three-dimensional shape corresponding to the virtual image about the light reflective surface and the three-dimensional shape corresponding to the real image of the object to be measured, to find a three-dimensional shape of the object to be measured.

An example of means for finding an equation expressing the light reflective surface of the mirror is one comprising means for measuring the coordinates of three or more points on the measuring stand on which the mirror is placed by a stereo method using two cameras, and means for finding the equation expressing the light reflective surface on the basis of the obtained coordinates of the three or more points on the measuring stand.

It is preferable that there is provided guide means for regulating the posture of the measuring head such that the light flux irradiated from the light irradiation means in the measuring head is perpendicularly emitted to the light reflective surface of the mirror.

BEST MODE FOR CARRYING OUT THE INVENTION

[A] Description of First Embodiment

Referring now to FIGS. 1 to 8, a first embodiment of the present invention will be described.

[A-1] Description of Schematic Configuration of Shape Measuring Device

Figure 1:
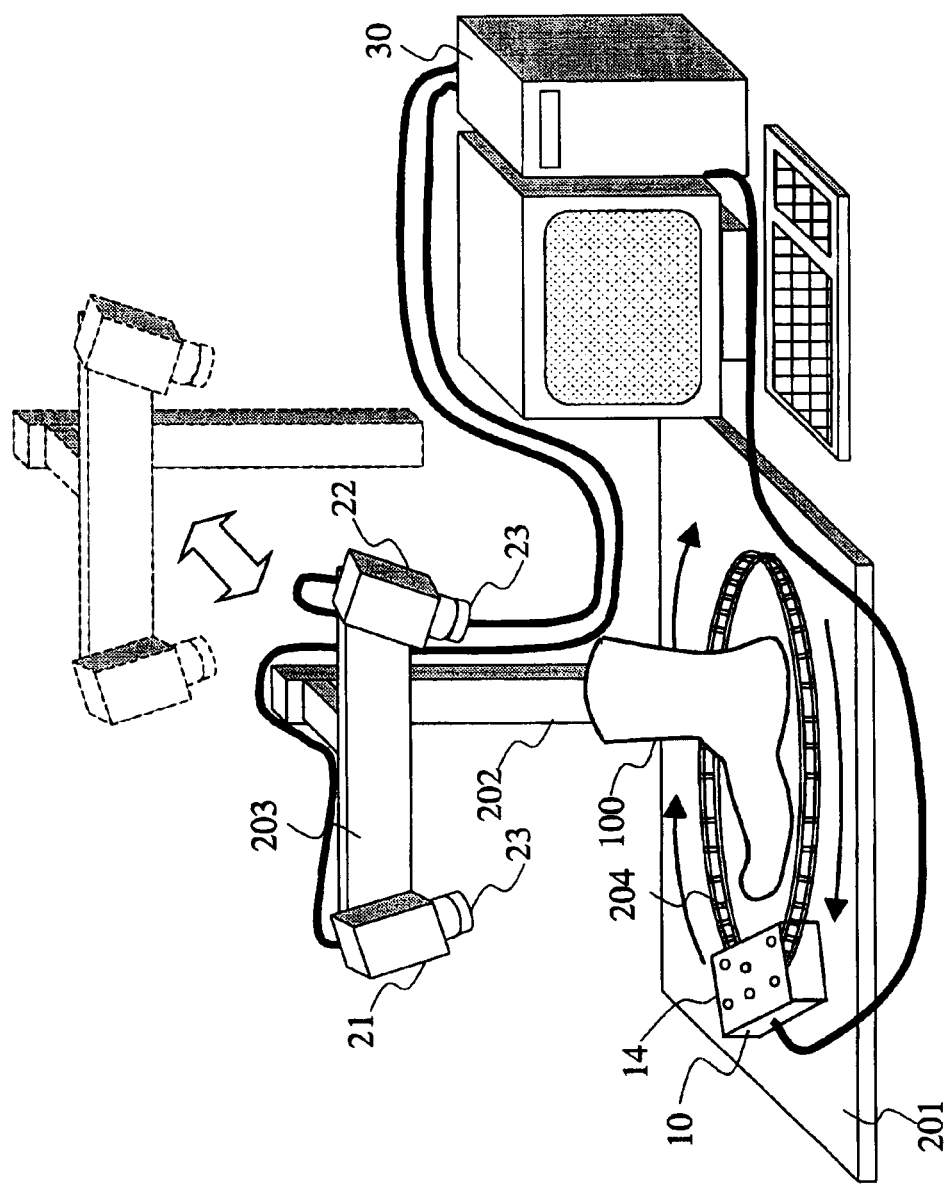
FIG. 1 is a perspective view showing the appearance of a shape measuring device in a first embodiment.

FIG. 1 illustrates the schematic configuration of a shape measuring device.

A guide rail 204 in an oblong shape is fixed to a measuring stand 201, and a foot 100 serving as an object to be measured is placed on a region surrounded by the guide rail 204. Further, a support 202 which is attachable and detachable to and from the stand 201 is attached to the stand 201, and a horizontal bar 203 is attached to its upper part.

The shape measuring device comprises a measuring head 10 which is moved on the guide rail 204 by a measuring person, stereo cameras 21 and 22 which are attached to both ends of the horizontal bar 203, and a controller 30 composed of a personal computer for carrying out their control and various operations. A band-pass filter 23 for selectively transmitting the frequency band of light emitted by a marker 14 shown in FIG. 2 is attached to an imaging lens in each of the stereo cameras 21 and 22.

[A-2] Description of Schematic Configuration of Measuring Head

Figure 2:
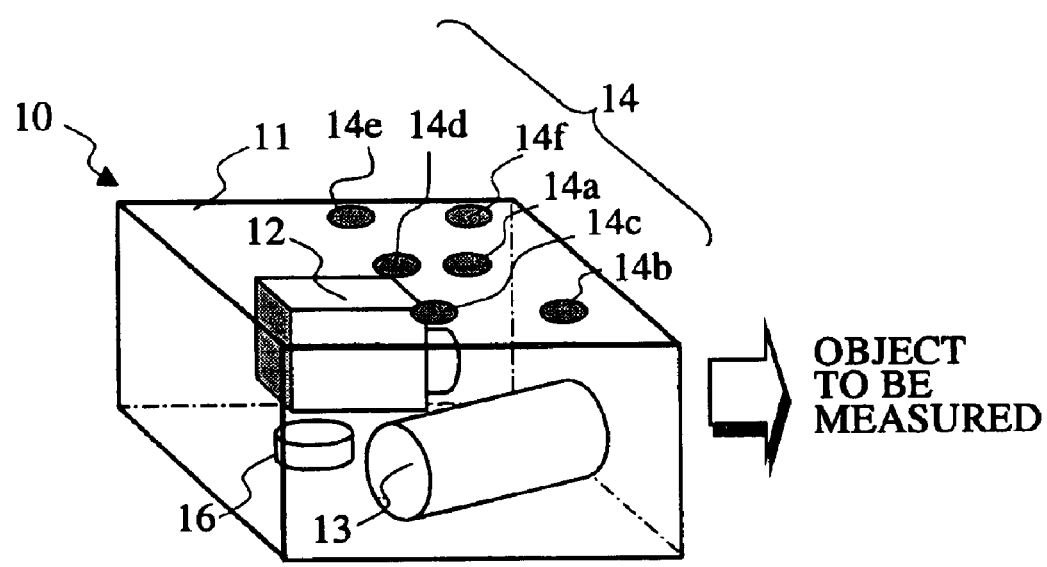
FIG. 2 is a perspective view showing a measuring head.
Figure 3:
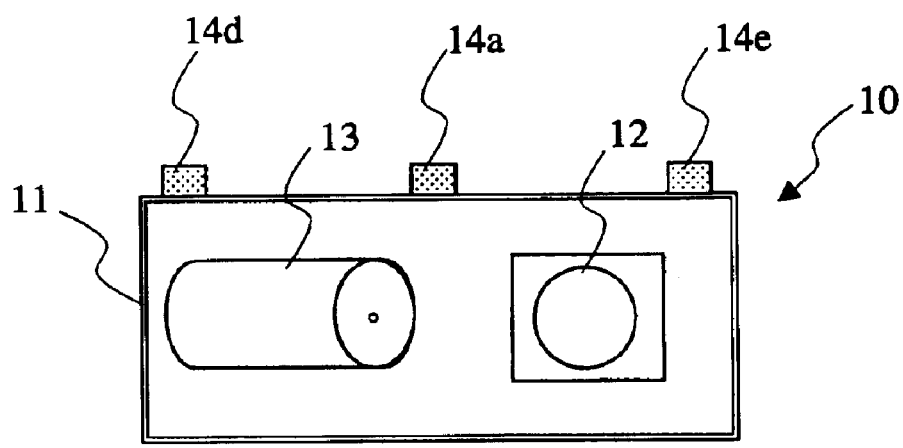
FIG. 3 is a front view showing a measuring head.
Figure 4:
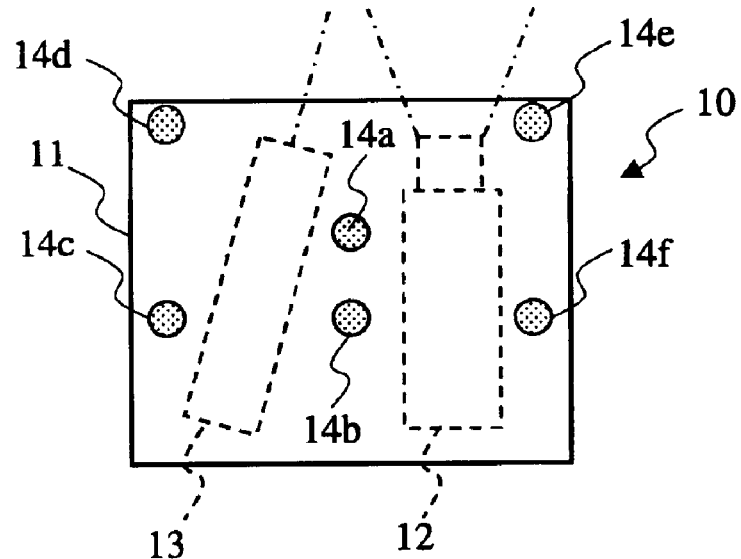
FIG. 4 is a plan view showing a measuring head.

FIGS. 2, 3, and 4 illustrate the schematic configuration of the measuring head 10.

The measuring head 10 comprises a casing 11 in a rectangular parallelepiped shape and opening forward, a CCD camera 12 and a slit light source 13 which are contained in the casing 11, and six LED light sources 14a and 14f which are provided on an upper surface of the casing 11. An example of the slit light source 13 is a semiconductor laser.

The six LED light sources 14a to 14f which constitute the marker 14 are not disposed so as to be point symmetrical but disposed so as to be axially symmetrical about a center line of the measuring head 10 in order to specify the direction of the measuring head 10. Here, five points of LED light sources 11b, 11c, 11d, 11e, and 11f are disposed so as to form a rectangle on the upper surface of the casing 11, and an LED light source 11a is disposed at the center of gravity among the five points.

In order to measure the position and the direction of the measuring head 10 in a three-dimensional space, at least three LED light sources are sufficient as the marker. However, the measuring accuracy of the position and the direction of the measuring head 10 are improved in a least-square manner by using four or more LED light sources.

The measuring head 10 is attached so as to be movable along the guide rail 204 by a supporting mechanism (not shown). Further, the measuring head 10 comprises an encoder 16 for detecting the position of the measuring head 10 using a predetermined position on the guide rail 204 as a reference position. An output of the encoder 16 is inputted to the controller 30.

[A-3] Description of Principle of Measurement by Shape Measuring Device

Figure 5:
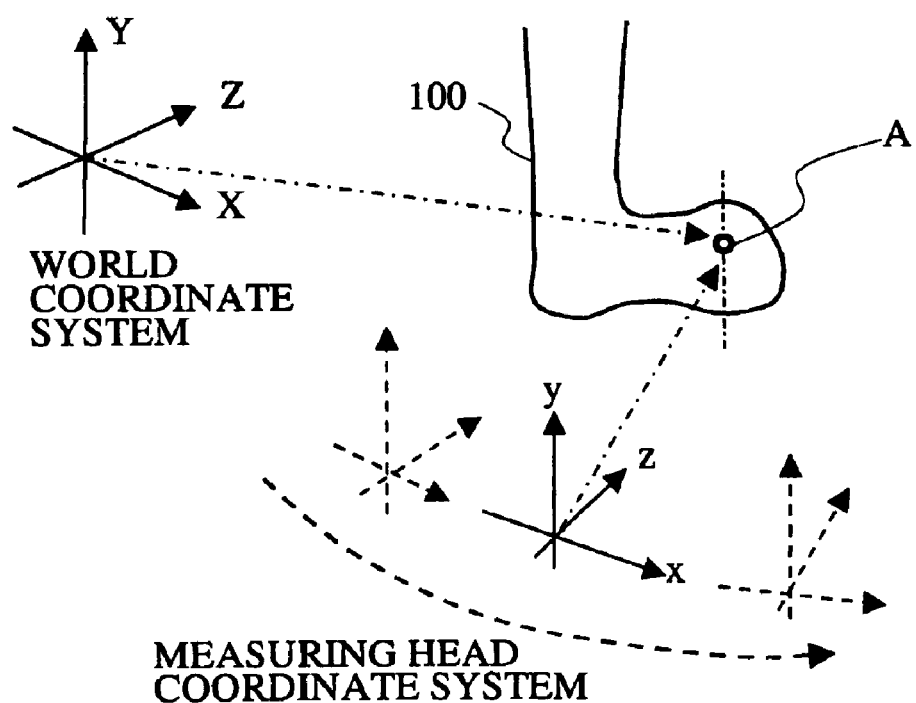
FIG. 5 is an explanatory view for explaining the principle of measurement.

FIG. 5 illustrates the principle of measurement by the shape measuring device.

The coordinates of a certain measuring point A are measured using the measuring head 10 which is moved on the guide rail 204 by the measuring person. The measured coordinates are represented by (x, y, z) in a measuring head coordinate system (hereinafter referred to as a camera coordinate system). The coordinate system is a coordinate system which moves as the measuring head 10 moves.

On the other hand, the shape of the object to be measured 100 is represented in a fixed coordinate system. The coordinate system is referred to as a world coordinate system. The coordinates in the world coordinate system of the measuring point which are measured by the measuring head 10 are taken as (X, Y, Z). The shape of the object to be measured 100 must be described in the world coordinate system. Accordingly, the coordinates (x, y z) in the measuring head coordinate system of the measuring point A which are measured by the measuring head 10 are converted into coordinates in the world coordinate system. The conversion is carried out on the basis of the following equation (1) using a rotation matrix R and a translation vector t which represent the movement of the measuring head 10:

$$\begin{pmatrix} X \\ Y \\ Z \end{pmatrix} = R \cdot \begin{pmatrix} x \\ y \\ z \end{pmatrix} + t \quad (1)$$

Consequently, the position and the direction in the world coordinate system of the measuring head 10 are found as the rotation matrix R and the translation vector t, thereby making it possible to convert the coordinates (x, y, z) in the measuring head coordinate system into coordinates in the world coordinate system.

[A-4] Description of Procedure for Shape Measurement Processing by Shape Measuring Device The measurement of the shape by the shape measuring device is made by the following procedure for processing.

First, preliminary processing is performed before making the measurement of the actual shape.

(1) First step (preliminary processing): Information related to each of the measuring positions in the world coordinate system of the measuring head 10 is stored in a memory (not shown) carried on the controller 30 with the information correlated with an output value of the encoder 16 at the measuring position of the measuring head 10.

After the preliminary processing, shape measurement processing comprising the following steps 2 and 3 is performed. The shape measurement processing can be performed by detaching the support 202 for supporting the stereo cameras 21 and 22 from the measuring stand 201.

(2) Second step: After the support 202 for supporting the stereo cameras 21 and 22 is detached from the measuring stand 201, the coordinates in the camera coordinate system of the measuring point on the object to be measured 100 are found using the measuring head 10.

(3) Third step: The coordinates in the camera coordinate system of the measuring point on the object to be measured are converted into coordinates in the world coordinate system on the basis of the information related to the position in the world coordinate system of the measuring head 10.

The steps will be described below.

[A-4-1] Description of First Step

Figure 6:
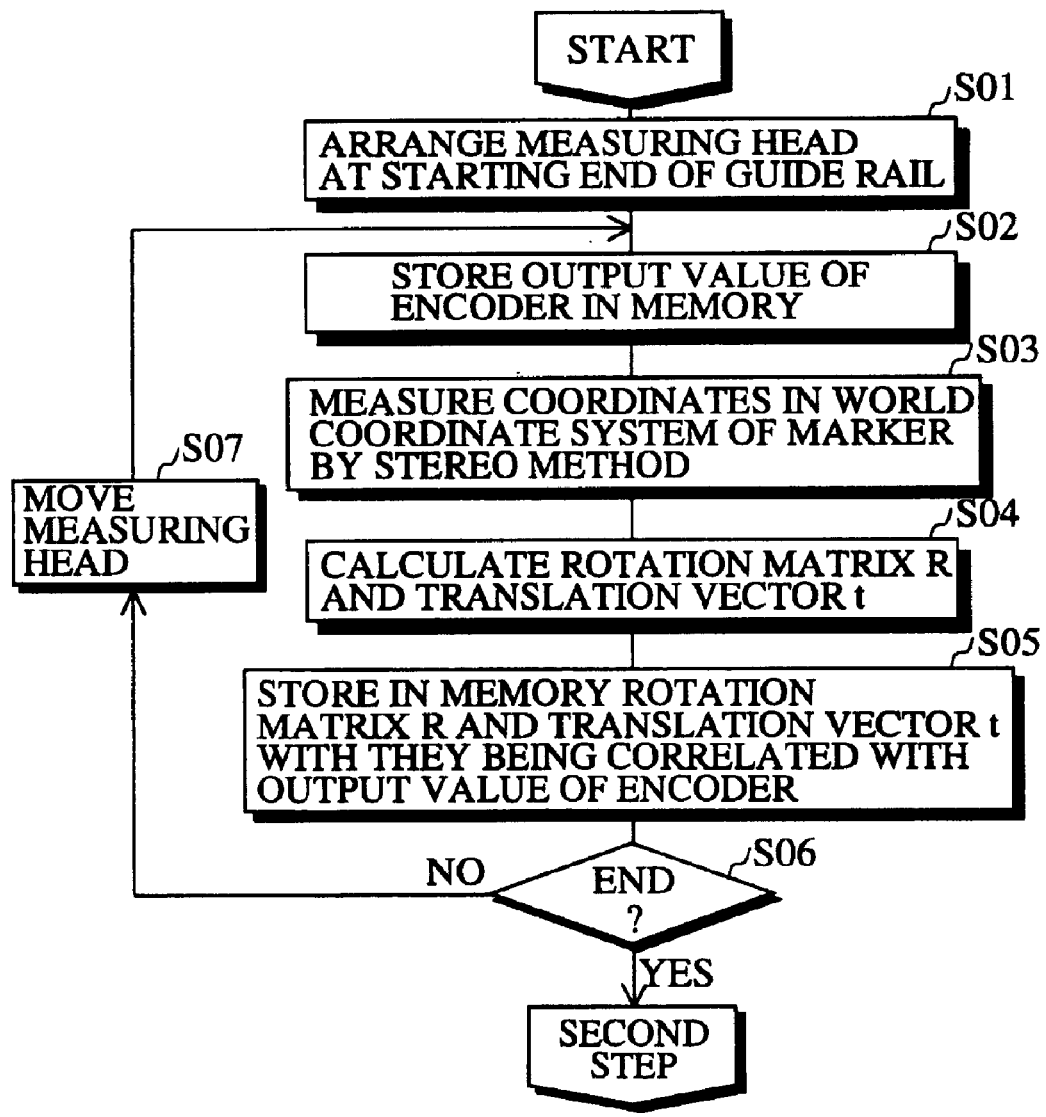
FIG. 6 is a flow chart for explaining the procedure for processing in a first step.

FIG. 6 is a flow chart for explaining the procedure for processing in the first step.

First, the measuring head 10 is arranged at a reference position of the guide rail 204 (step S01). An output value of the encoder 16 at the position is stored in the memory in the controller 30 (step S02).

The coordinates in the world coordinate system of the marker 14 provided in the measuring head 10 are then measured by the stereo cameras 21 and 22. The position measuring method has been well-known as a stereo method and hence, the description thereof is not repeated (step S03).

The coordinates in the camera coordinate system of each of the LED light sources 14a to 14f constituting the marker 14 are taken as (xi, yi, zi), and the coordinates in the world coordinate system of each of the LED light sources 14a to 14f which are measured by the stereo cameras 21 and 22 are taken as (Xi, Yi, Zi), where i is 1, 2, ... 6. The coordinates (xi, yi, zi) in the camera coordinate system of each of the LED light sources 14a to 14f have already been known.

A rotation matrix R and a translation vector t which represent the movement of the measuring head 10 are found as a matrix R and a vector t which satisfy the following equation (2) (step S04). The matrix R and the vector t which are found are stored in the memory with they being correlated with the output value of the encoder 16 which has been previously stored in the memory (step S05).

$$\min \Sigma_i[(Xi-xi)^2+(Yi-yi)^2+(Zi-zi)^2] \quad (2)$$

$$\begin{pmatrix} Xi \\ Yi \\ Zi \end{pmatrix} = R \cdot \begin{pmatrix} x \\ y \\ z \end{pmatrix} + t$$

The measuring head 10 is moved along the guide rail 204, to repeat the processing in the foregoing steps S02 to S05 with respect to all the measuring positions (steps S06 and S07). Consequently, table data stored with the output value of the encoder 16 and the rotation matrix R and the translation vector t at the position correlated with each other is produced and is stored in the memory in the controller 30.

[A-4-2] Description of Second Step

Figure 7:
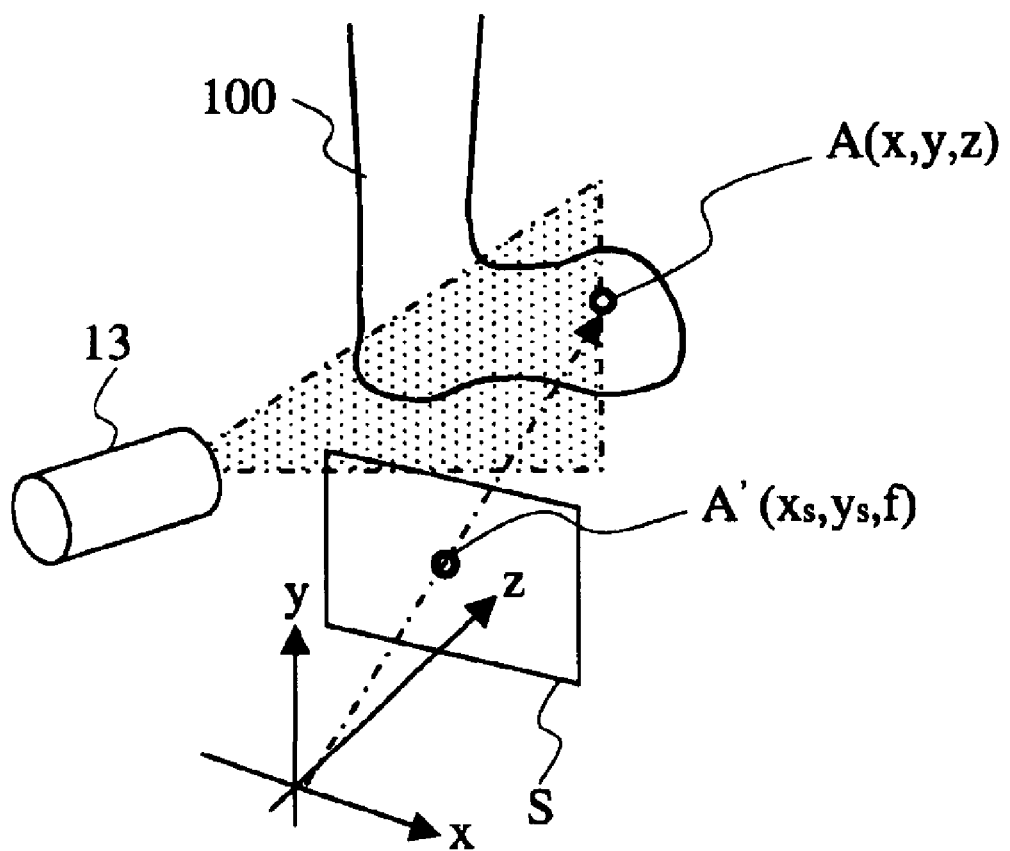
FIG. 7 is an explanatory view for explaining a method of measuring the position of a measuring point by a measuring head.

FIG. 7 illustrates a method of measuring the position of the measuring point by the measuring head 10.

As shown in FIG. 7, the camera coordinate system is a coordinate system having as an origin an optical center of the CCD camera 12, taking the direction of an optical axis as a z-axis, taking the horizontal direction of the CCD camera 12 as an x-axis, and taking the vertical direction of the CCD camera 12 as a y-axis. An image surface S of the CCD camera 12 exists at a position spaced a focal length f apart from the origin. That is, the image surface S is a plane parallel to an x-y plane and satisfying z=f.

The method itself of measuring the position by the measuring head 10 is a known measuring method called a light-section method. A predetermined point on a line irradiated with slit light from the slit light source 13 on a surface of the object to be measured 100 is taken as a measuring point A.

The coordinates in the camera coordinate system of the measuring point A are taken as (x, y, z), the coordinates of an observing point A' corresponding to the measuring point A on the image surface S are taken as (xs, ys, f), and an equation expressing a plane representing the slit light is taken as $a_L x + b_L y + c_L z + d_L = 0$. f in the coordinates (xs, ys, f) of the observing point A' has already been known as the focal length of the CCD camera 12, and (xs, ys) are found from the pixel position of the slit light observed on the image surface.

The equation expressing the plane representing the slit light is found by calibrating the measuring head 10. Consequently, (x, y, z) are found by solving simultaneous equations expressed by the following equation (3) having x, y, z, and α as unknowns:

$$a_L x + b_L y + c_L z + d_L = 0$$

$$x = \alpha \cdot xs$$

$$y = \alpha \cdot ys$$

$$z = \alpha \cdot f \quad (3)$$

The processing is performed by the controller 30 on the basis of the output of the CCD camera 12.

(A-4-3) Description of Third Step

In the third step, on the basis of the output of the encoder 16, the rotation matrix R and the translation vector t which correspond thereto are first read out of the memory in the controller 30.

The coordinates in the camera coordinate system of the measuring point on the foot 100 which are found in the third step are converted into coordinates in the world coordinate system on the basis of the rotation matrix R and the translation vector t which are obtained.

The processing in the second step and the fourth step is repeated with respect to all observing positions on the guide rail 204 while moving the measuring head 10 along the guide rail 204, thereby finding the shape of the foot 100 as a set of the coordinates (X, Y, Z) in the world coordinate system of the measuring point obtained each time.

According to the above-mentioned embodiment, the coordinates in the measuring head coordinate system of the measuring point obtained using the measuring head 10 are converted into coordinates in the world coordinate system using table data stored with the position of the measuring head 10 based on the predetermined position on the guide rail 204 and the rotation matrix R and the translation vector t which correspond to the position correlated with each other. Accordingly, the necessity of the stereo cameras 21 and 22 is eliminated in measuring the shape. Therefore, the shape of the object to be measured can be measured in a compact configuration and without a user being conscious of a field of view of a camera and a tangle of a code.

According to the above-mentioned embodiment, the position of the measuring head 10 on the guide rail 204 in the preliminary processing is measured by the stereo cameras 21 and 22. Accordingly, the shape of the guide rail 204 is not limited to a simple shape such as a straight line or a circle. For example, the guide rail 204 can be constructed in an arbitrary curved shape including an oblong shape depending on the shape of the object to be measured.

According to the above-mentioned embodiment, the guide rail 204 is constructed in an oblong shape. When a human foot is used as the object to be measured 100, therefore, the measuring head 10 is moved while keeping the distance thereof from the foot approximately constant. Consequently, a measuring error depending on the distance between the foot and the measuring head is made uniform, thereby making it possible to maintain not less than predetermined accuracy with respect to the whole of data representing the shape of the foot obtained by the measurement.

Furthermore, in a portion having a large curvature of the guide rail 204 in an oblong shape, the tiptoe and the heel of the foot are positioned. Measurement data representing the tiptoe and the heel can be more fully acquired, as compared with the side of the foot. Deformation by hallux valgus appears in the tiptoe, and deformation by callus appears in the heel. In measuring the shape of the foot, the shape of the portion is particularly important. If data representing the shapes of the tiptoe and the heel can be fully acquired, therefore, the shape of the foot can be measured with high precision.

Furthermore, the stereo cameras 21 and 22 are constructed so as to be detachable from the measuring stand 201. When the track on the guide rail 204 is changed as the device is installed or moved, the accuracy can be maintained by attaching the stereo cameras 21 and 22 to register or update the table data, thereby making it possible to provide higher reliability.

Although in the above-mentioned embodiment, the measuring head 10 is manually moved, it may be automatically moved using a motor. This makes it possible to automatically measure the object to be measured.

In the above-mentioned embodiment, information related to the position in the world coordinate system of the measuring head, that is, the rotation matrix R and the translation vector t are found using outputs of the stereo cameras 21 and 22. When the track on the guide rail 204 corresponding to the measuring stand 201 is specified, however, the rotation matrix R and the translation vector t can be found without using the stereo cameras 21 and 22.

The measuring head 10 may differ from that in the above-mentioned embodiment, provided that it measures the position of a measuring point on the object to be measured by an active stereo measuring method. For example, the slit light source 13 may be replaced with a spot light source.

The marker 14 is not limited to the LED light sources 14a to 14f, provided that it can be extracted in the stereo cameras. For example, the LED light sources 14a to 14f may be replaced with a seal having a high index of reflection. Further, the number of markers 14 may be not less than three.

Although in the above-mentioned embodiment, the track on the guide rail 204 is in an oblong shape in order to measure the shape of the foot, the present invention is not limited to the same. It may be in a shape having a longitudinal direction in a direction from the tiptoe to the heel of the foot. For example, the shape may be such a shape that a circle is divided into four, and its corners are connected to each other by a curved line, or a shape having a constricted part like a gourd.

Figure 8:
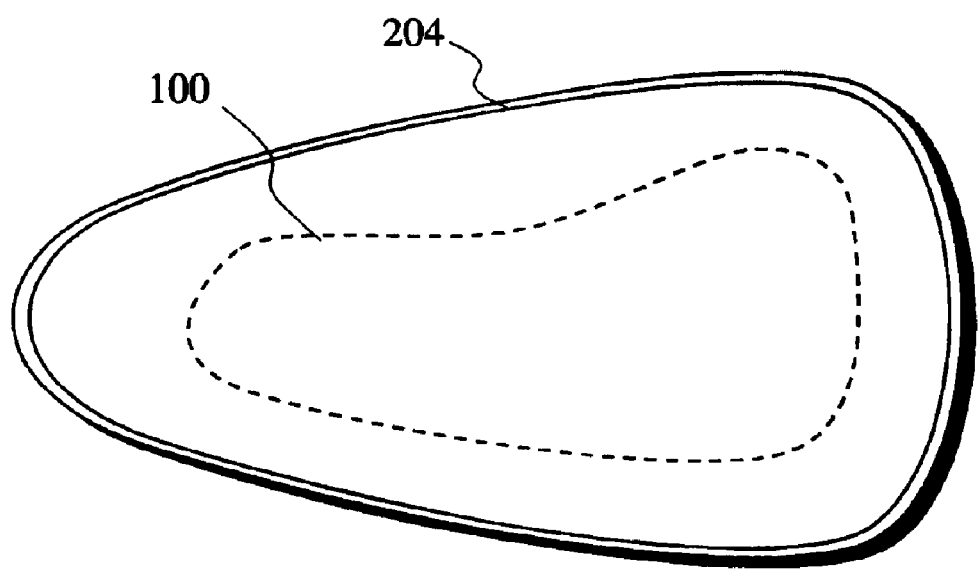
FIG. 8 is a plan view showing another shape of a guide rail.

The shape of the foot generally takes such a shape that the heel is narrower than the tiptoe. Accordingly, the track on the guide rail 204 may be in an oblong shape tapered from the tiptoe to the heel, as shown in FIG. 8. In this case, a measuring error depending on a portion between the object to be measured and the measuring head is further made uniform, thereby making it possible to maintain not less than predetermined accuracy with respect to the whole of the data representing the shape of the foot obtained by the measurement.

[B] Description of Second Embodiment

Referring now to FIGS. 9 to 25, a second embodiment of the present invention will be described.

[B-1] Description of Schematic Configuration of Shape Measuring Device

Figure 9:
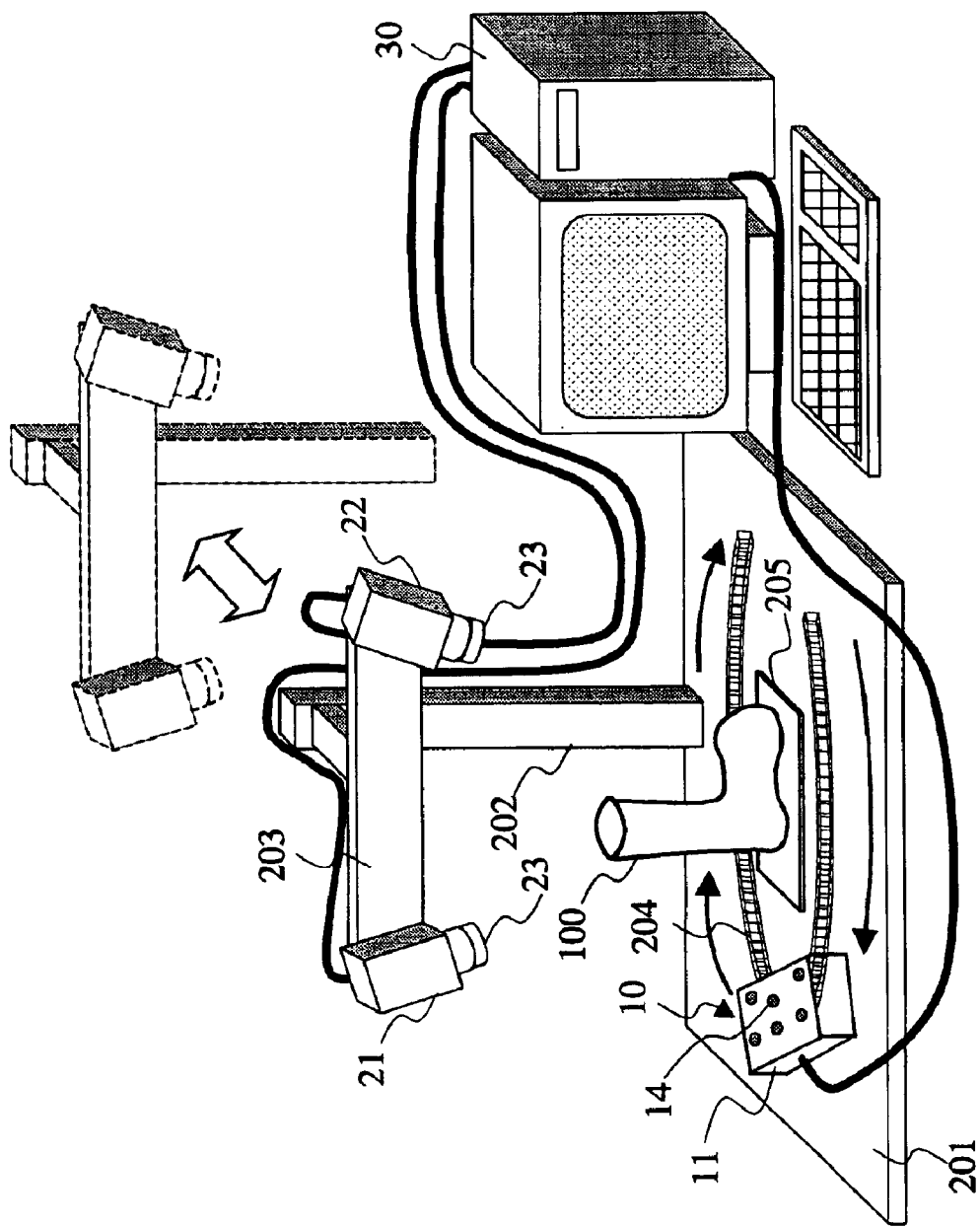
FIG. 9 is a perspective view showing the appearance of a shape measuring device in a second embodiment.

FIG. 9 illustrates the schematic configuration of a shape measuring device.

In FIG. 9, the same units as those shown in FIG. 1 are assigned the same reference numerals and hence, the description thereof is not repeated.

A mirror 205 in a flat plate shape is arranged in a region surrounded by a guide rail 204 on a measuring stand 201. An example of the mirror 205 is a stainless mirror 205 having a light reflective surface on its surface. A foot 100 serving as an object to be measured is placed on the stainless mirror 205.

A measuring head 10 is attached to the guide rail 204 by a supporting mechanism (not shown). Consequently, the posture of the measuring head 10 is regulated such that a light flux emitted from a slit light source 13 is emitted along a surface perpendicular to the stainless mirror 205.

[B-2] Description of Procedure for Measurement Processing by Shape Measuring Device The measurement of the shape by the shape measuring device is made by the following procedure for processing.

(1) First step (preliminary processing): Information related to each of the measuring positions in a world coordinate system of the measuring head 10 is stored in a memory (not shown) carried on a controller 30 with the information correlated with an output value of an encoder 16 at the measuring position of the measuring head 10.

(2) Second step (preliminary processing): An equation, in the world coordinate system, expressing a plane representing the stainless mirror 205 is calculated.

(3) Third step: The coordinates in a camera coordinate system of a measuring point on the object to be measured are found using the measuring head 10.

(4) Fourth step: The coordinates in the camera coordinate system of the measuring point on the object to be measured are converted into coordinates in the world coordinate system on the basis of the information related to the position in the world coordinate system of the measuring head 10.

(5) Fifth step: The coordinates on a virtual image reflected on the stainless mirror 205 out of measuring points in the world coordinate system are converted into coordinates on a real image.

The steps will be described.

[B-2-1] Description of First Step

The first step is the same as the first step in the above-mentioned first embodiment (see FIG. 6) and hence, the detailed description thereof is omitted.

[B-2-2] Description of Second Step

In the second step, the stainless mirror 205 provided on the measuring stand 201 is first covered with an opaque thin plate, and the coordinates in the world coordinate system of a point on the thin plate are measured by a stereo method.

An equation $A_M X + B_M Y + C_M Z + D_M = 0$ expressing a plane of the stainless mirror 205 is then calculated on the basis of the obtained coordinates in the world coordinate system of the point on the thin plate. In calculating the equation expressing the plane, at least three points may be provided as the point on the flat plate.

At this time, instead of covering the stainless mirror 205 with the opaque thin plate to make measurement, the equation expressing the plane of the stainless mirror 205 may be calculated by providing at least three markers on the stainless mirror 205 and measuring the positions of the markers.

The equation $A_M X + B_M Y + C_M Z + D_M = 0$ expressing the plane of the stainless mirror 205 may be found For example, the equation, expressing the plane of the stainless mirror 205, obtained in the second step is taken as $A_M X + B_M Y + C_M Z + D_M = 0$. $\beta$ ($= A_M X + B_M Y + C_M Z + D_M$) is found for each of the measuring points using the coordinates in the world coordinate system of the measuring point. The measuring point satisfying $\beta \geq 0$ is above the plane of the stainless mirror 205 (on the positive side on a coordinate axis). Accordingly, it is identified as a measuring point on the real image $I_1$ of the foot 100. Contrary to this, the measuring point satisfying $\beta < 0$ is identified as a measuring point on the virtual image $I_2$ of the foot 100 reflected on the stainless mirror 205.

Figure 11:
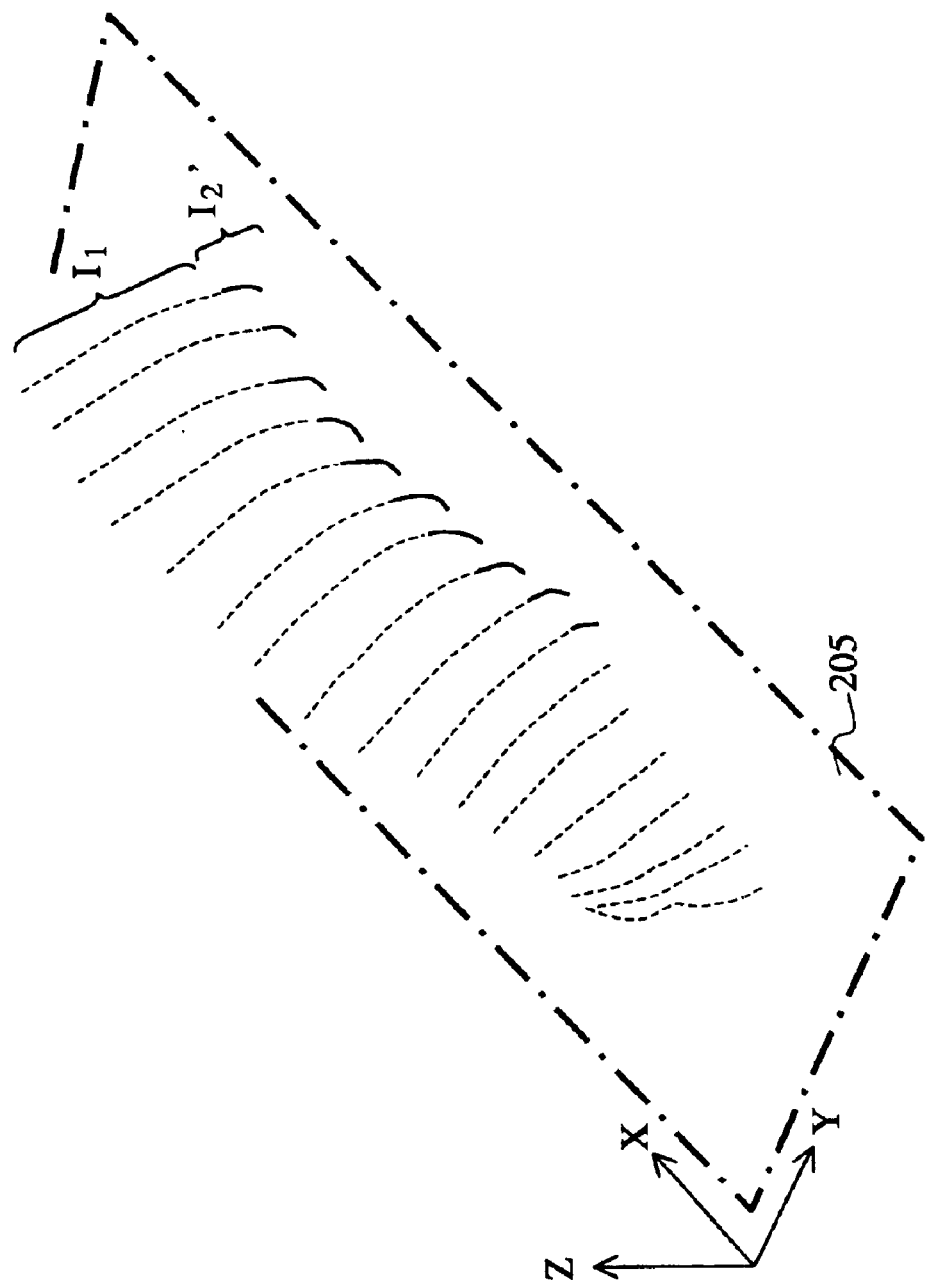
FIG. 11 is an explanatory view showing an image of a foot obtained in a fifth step.

An image $I_2'$ which is symmetrical to the virtual image $I_2$ about the plane of the stainless mirror 205 is found, and the obtained symmetrical image $I_2'$ is synthesized with the real image $I_1$, thereby obtaining an image of the foot 100 as shown in FIG. 11.

As shown in FIG. 11, in the image thus obtained, its portion corresponding to the arch of the foot 100 is complemented by the image $I_2'$ produced on the basis of the virtual image $I_2$ reflected on the stainless mirror 205, so that the shape of the foot using the measuring head 10. That is, the stainless mirror 205 provided on the measuring stand 201 is covered with the opaque thin plate, and the thin plate is imaged by the measuring head 10, to extract the coordinates of the three points for finding the plane of the thin plate (coordinates in the camera coordinate system). The extracted coordinates in the camera coordinate system of the three points are converted into coordinates in the world coordinate system on the basis of a rotation matrix R and a translation vector t, which correspond to the position of the measuring head 10, formed in the first step. The equation, in the world coordinate system, expressing the plane of the thin plate is found on the basis of the obtained coordinates in the world coordinate system of the three points.

In the subsequent processing for arranging the object to be measured on the measuring stand 201 to make measurement, the stereo cameras 21 and 22 are not used. Accordingly, the measurement is made by detaching the object to be measured, together with the support 202, from the measuring stand 201, as indicated by an arrow in FIG. 9.

[B-2-3] Description of Third Step

The third step is the same as the second step in the above-mentioned first embodiment and hence, the detailed description thereof is omitted.

[B-2-4] Description of Fourth Step

The fourth step is the same as the third step in the above-mentioned first embodiment and hence, the detailed description thereof is omitted. In the second embodiment, however, an image of a foot 100 comprising a real image $I_1$ (indicated by a broken line in FIG. 10) produced from a measuring point at which the foot 100 is irradiated with a light flux from the slit light source 13 and a virtual image $I_2$ (indicated by a solid line in FIG. 10) produced from the measuring point at which the foot 100 is irradiated with the light flux from the slit light source 13 through the stainless mirror 205 is produced, as shown in FIG. 10.

[B-2-5] Description of Fifth Step

Figure 10:
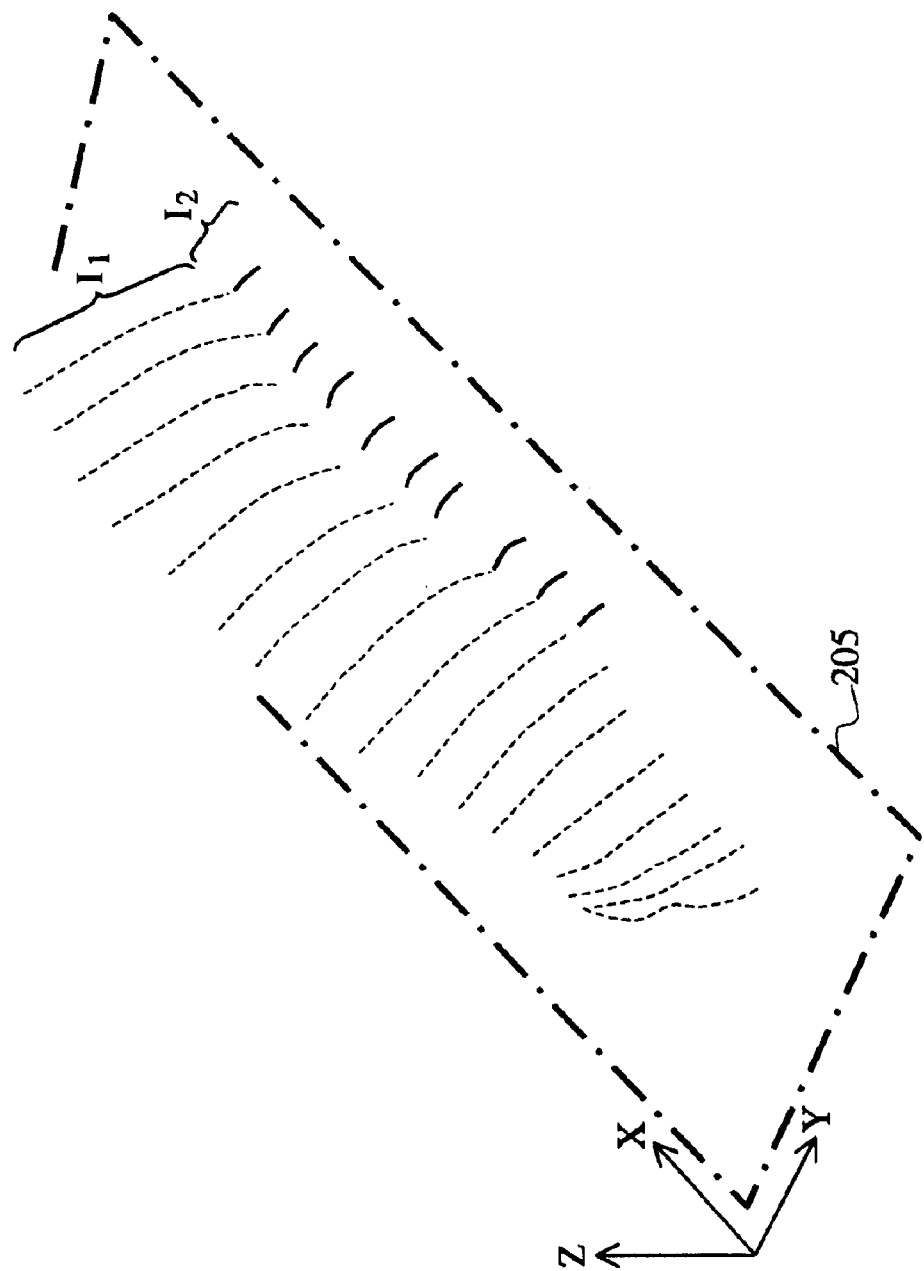
FIG. 10 is an explanatory view showing an image of a foot obtained in a fourth step.

In the fifth step, the real image $I_1$ of the foot 100 indicated by the broken line in FIG. 10 and the virtual image $I_2$ of the foot 100, reflected on the stainless mirror 205, indicated by the solid line in FIG. 10 are first distinguished on the basis of the image of the foot 100 shown in FIG. 10 obtained in the fourth step.

The distinguishing method will be described. 100 is more faithfully reproduced.

According to the above-mentioned embodiment, the stainless mirror 205 is disposed on an upper surface of the measuring stand 201, to synthesize the image produced on the basis of the virtual image reflected on the stainless mirror 205 with the real image of the foot 100 serving as the object to be measured. Accordingly, an image corresponding to a concaved portion, for example, the arch of the foot can be complemented, thereby making it possible to produce a suitable three-dimensional shape of the foot 100.

At this time, the image (the virtual image) corresponding to the concaved portion, for example, the arch of the foot 100 and a side surface (a real image) are simultaneously measured, thereby making it possible to measure the suitable three-dimensional shape in a small number of procedures for measurement.

According to the above-mentioned embodiment, the posture of the measuring head 10 is regulated such that a light flux emitted from the slit light source 13 is emitted along a surface perpendicular to the stainless mirror 205. At the time of the measurement, a light flux directly irradiated onto the foot 100 from the slit light source 13 and a light flux irradiated onto the foot 100 after being reflected on the stainless mirror 205 once are overlapped with each other. Consequently, the light flux reflected on the stainless mirror 205 does not produce an erroneous image, thereby making it possible to make the measurement with high precision.

According to the above-mentioned embodiment, after initialization in the first and second steps is completed, the object to be measured can be measured by detaching the stereo cameras 21 and 22 from the measuring stand 201, thereby making it possible to miniaturize the measuring device.

Even if the track on the guide rail 204 is changed by the movement of the measuring device, for example, the accuracy can be maintained by attaching the stereo cameras 21 and 22 to update table data.

In the above-mentioned embodiment, the stainless mirror 205 having an exposed light reflective surface is used in order to take the upper surface of the measuring stand 201 as a mirror surface. Accordingly, light is not refracted on the reflective surface, thereby making it possible to make the measurement with high precision.

Although in the above-mentioned embodiment, the measuring head 10 is manually moved by a measuring person, the measuring head 10 may be automatically moved along the guide rail 204 using a motor. This makes it possible for the measuring person to automatically measure the object to be measured without touching the measuring head.

Figure 12:
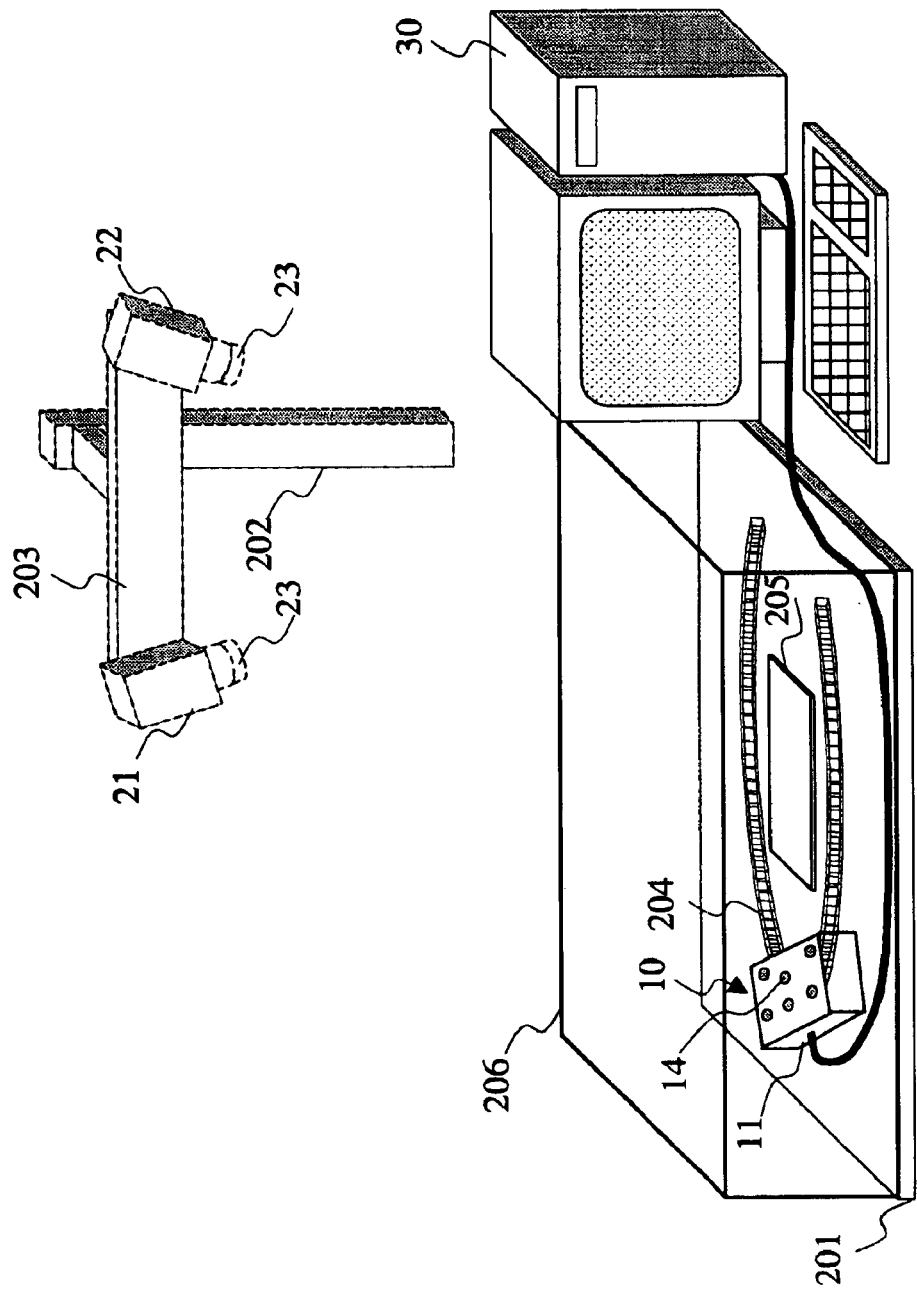
FIG. 12 is a schematic view showing another configuration of a shape measuring device.

Furthermore, when the measuring head 10 is moved using the motor, the measuring person need not touch the measuring head 10 while the object to be measured is disposed and measured. Therefore, the whole of the measuring device can be covered with a case 206, as shown in FIG. 12. Consequently, disturbance light such as illuminating light can be intercepted, thereby making it possible to make the measurement with high precision.

Figure 13:
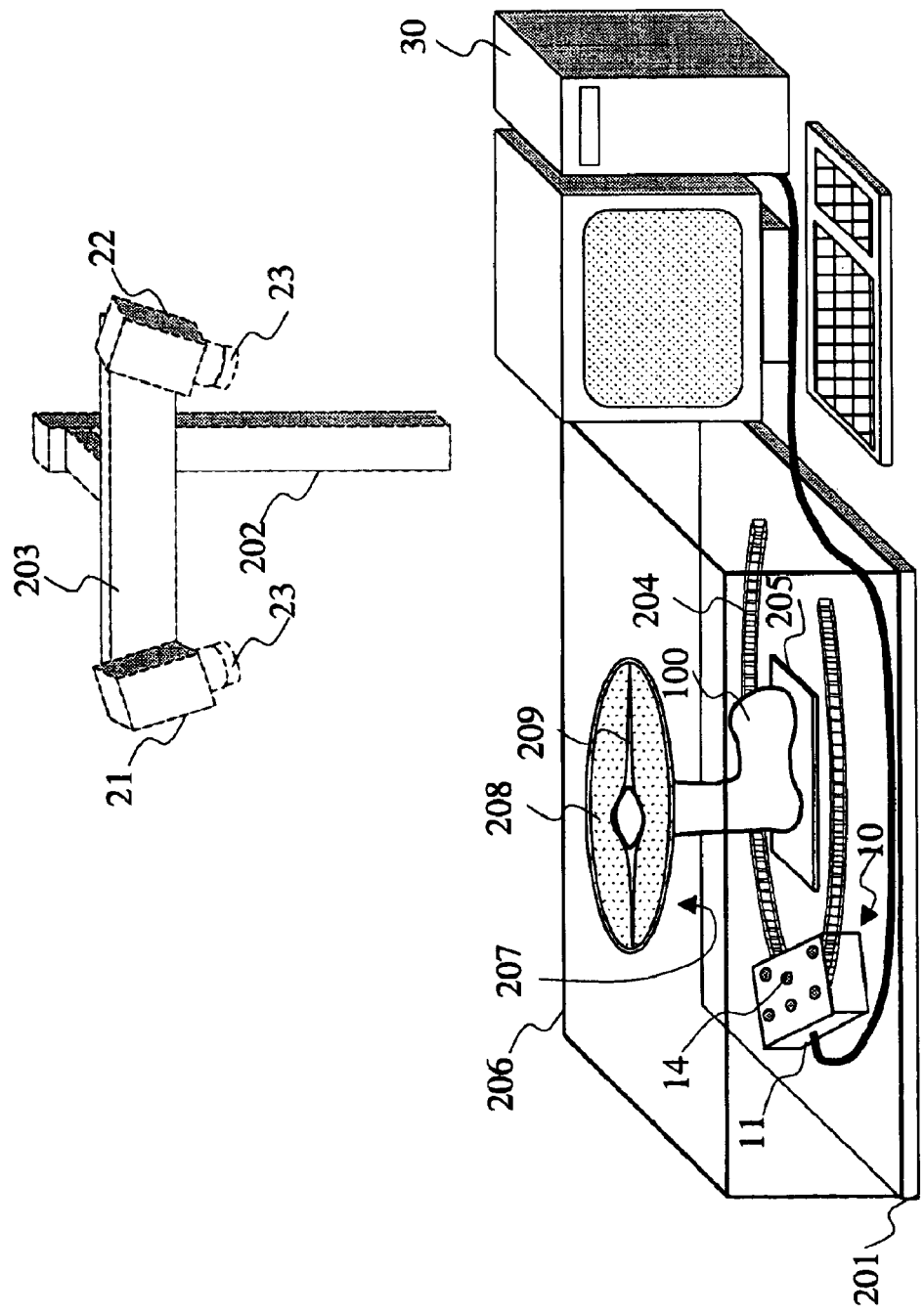
FIG. 13 is a schematic view showing still another configuration of a shape measuring device.

When the shape of a human foot is measured, an opening 207 may be provided in an upper part of the case 206, as shown in FIG. 13. In this case, the opening 207 is closed up by an elastic plate 208 composed of an elastic member such as rubber and is so constructed that the object to be measured, for example, the foot can be inserted from a slit 209 provided in the elastic plate 208. Accordingly, disturbance light such as illuminating light is not incident from a clearance between the opening 207 and the object to be measured, thereby making it possible to make the measurement with high precision.

Figure 14:
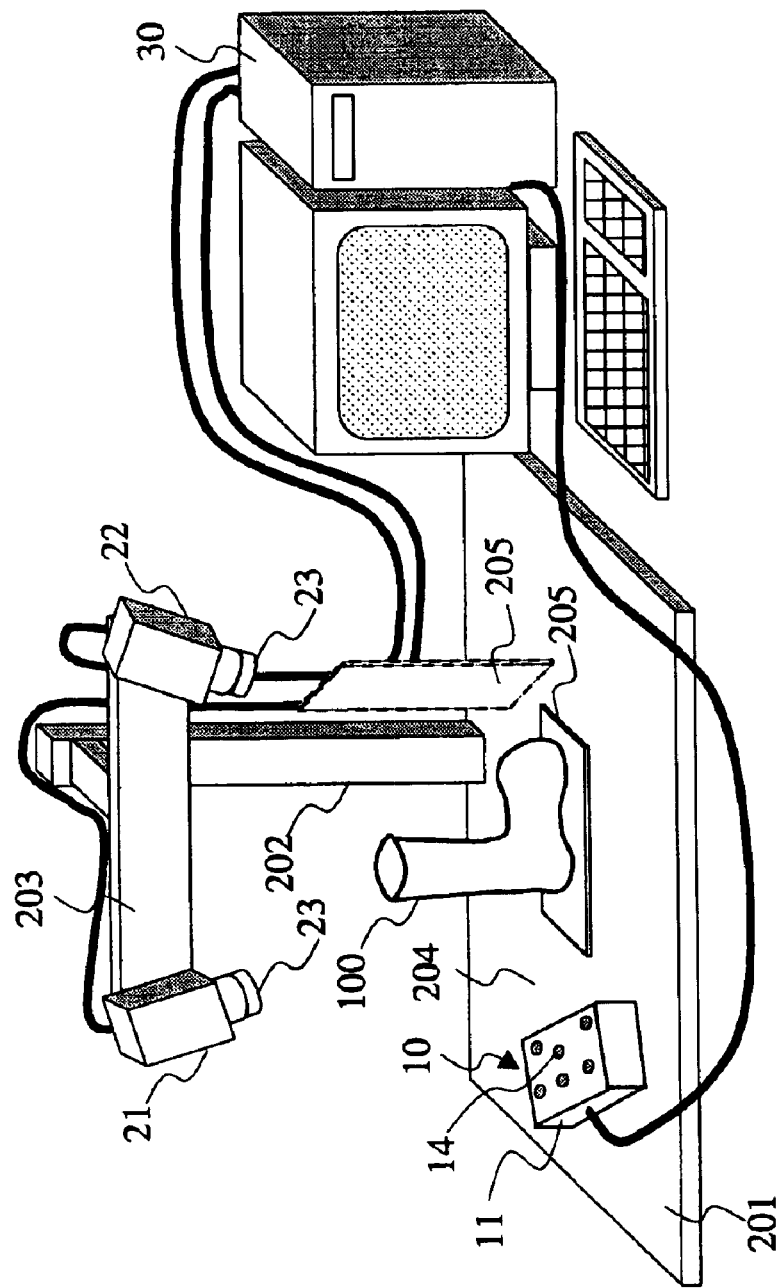
FIG. 14 is a schematic view showing a further configuration of a shape measuring device.

Although in the above-mentioned embodiment, description was made of a case where the measuring head 10 is moved along the guide rail 204, the measuring head 10 may be freely moved, as shown in FIG. 14. In this case, the processing in the steps S03 and S04 in the first step (see FIG. 6) is performed for each of the measuring positions of the measuring head 10.

The stainless mirror 205 may be disposed in not only a position parallel to the upper surface of the measuring stand 201 but also an arbitrary position, for example, a position perpendicular to the upper surface of the measuring stand 201, as indicated by a broken line in FIG. 14, for example. In this case, if the second step is carried out every time the position of the stainless mirror 205 is changed, suitable measurement can be made irrespective of the position of the stainless mirror 205. Consequently, the position of the stainless mirror 205 can be arbitrarily changed depending on the size and the shape of the object to be measured 100. If the stainless mirror 205 is disposed at a suitable position, therefore, a suitable three-dimensional shape can be measured in a small number of procedures for measurement.

The mirror 205 is not limited to the stainless mirror. Various members having a high index of light reflection may be used.

In the above-mentioned embodiment, information related to the position in the world coordinate system of the measuring head 10, that is, the rotation matrix R and the translation vector t are found using outputs of the stereo cameras 21 and 22. If a moving track of the measuring head 10 is specified, however, the rotation matrix R and the translation vector t are found without using the stereo cameras 21 and 22.

The measuring head 10 may differ from that in the above-mentioned embodiment, provided that it can measure the position of the measuring point on the object to be measured. For example, the slit light source 13 may be replaced with a spot light source.

Figure 15:
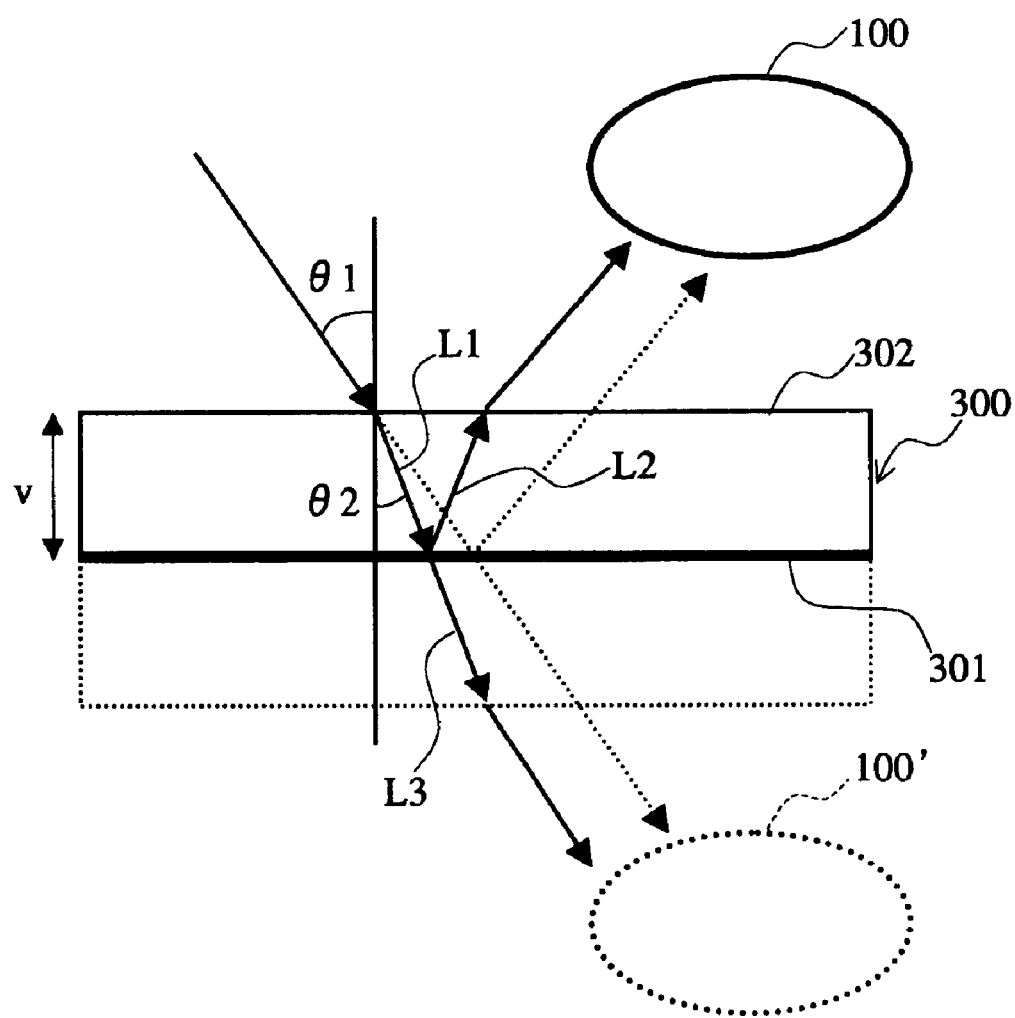
FIG. 15 is a schematic view showing, when a mirror comprising a light reflecting plate having a light reflective surface formed on its surface and a transparent glass plate formed on the light reflecting plate is used, how light is refracted on the transparent glass plate.

[B-3] Description of Embodiment in Case Where Mirror Comprising Light Reflecting Plate Having Light Reflective Surface Formed on its Surface and Transparent Glass Plate Formed on Light Reflecting Plate is Used Although in the above-mentioned embodiment, the stainless mirror 205 having a light reflective surface on its surface is used as a mirror, a mirror 300 comprising a light reflecting plate 301 having a light reflective surface formed on its surface and a transparent glass plate 302 formed on the light reflecting plate 301, as shown in FIG. 15, can be used in place of the stainless mirror 205 in order to measure the shape on a reverse surface of the foot 100 in a wider range.

When the mirror 300 is used, however, light is refracted when it passes through the transparent glass plate 302. Accordingly, the following correction is required.

A light flux emitted from the slit light source 13 in the measuring head 10 is incident from the upper surface of the mirror 300, and is reflected on the light reflecting plate 301 in the mirror 300 after passing through the transparent glass plate 302, as indicated by an arrow L1. The reflected light is emitted from the upper surface of the mirror 300 again after passing thorough the transparent glass plate 302, and is irradiated onto the object to be measured 100, as indicated by an arrow L2. The light flux is refracted when it passes through the transparent glass plate 302. Accordingly, an equation $a_L x+b_L y+c_L z+d_L=0$ expressing the light flux in a case where the object to be measured 100 is irradiated therewith must be corrected in consideration of the bending of light.

That is, the equation $a_L x+b_L y+c_L z+d_L=0$ expressing the light flux used in the third step must be corrected in consideration of the bending of light.

The light flux reflected from the object to be measured 100 is similarly incident from the upper surface of the mirror 300, and is reflected on the light reflecting plate 301 in the mirror 300 after passing through the transparent glass plate 302. The reflected light is emitted from the upper surface of the mirror 300 again after passing through the transparent glass plate 302, and is incident on the CCD camera 12. Consequently, (xs, ys) in the coordinates of a measuring point (the coordinates of an observing point) (xs, ys, f) on the image surfaces of the CCD camera 12 must be also corrected in consideration of the bending of light.

That is, (xs, ys) in the coordinates (xs, ys, f) of the observing point used in the third step must be corrected in consideration of the bending of light.

Furthermore, in the second step, an equation $a_M X+b_M Y+c_M Z+d_M=0$, in the world coordinate system, expressing the upper surface of the stainless mirror 205 provided on the measuring stand 201 is found. When the mirror 300 is used, however, the equation $a_M X+b_M Y+c_M Z+d_M=0$, in the world coordinate system, expressing the upper surface of the light reflecting plate 301 in the mirror 300 must be found.

It is assumed herein that the thickness of the light reflecting plate 301 in the mirror 300 is very small, to find the equation, in the world coordinate system, expressing a surface of the measuring stand 201 on which the mirror 300 is placed in place of the equation $a_M X+b_M Y+c_M Z+d_M=0$, in the world coordinate system, expressing the upper surface of the light reflecting plate 301 in the mirror 300. The equation expressing the surface of the measuring stand 201 can be found in the following manner.

Specifically, the measuring stand 201 is covered with an opaque thin plate, and the coordinates in the world coordinate system of a point on the flat plate are measured by a stereo method. The equation expressing the surface of the measuring stand 201 is calculated on the basis of the obtained coordinates in the world coordinate system of the point on the thin plate. In calculating the equation expressing the plane, at least three points may be provided as the point on the thin plate.

Instead of covering the measuring stand 201 with the opaque thin plate to make measurement, the equation expressing the surface of the measuring stand 201 may be calculated by providing at least three markers on the measuring stand 201 to measure the positions of the markers.

Meanwhile, the light flux emitted form the slit light source 13 is irradiated onto the object to be measured 100 after passing through the transparent glass plate 302 twice, as indicated by arrows L1 and L2 in FIG. 15. Consequently, light bending properties in a case where the light flux emitted from the slit light source 13 is reflected on the mirror 300 and is irradiated onto the object to be measured 100 are equivalent to bending properties in a case where light is irradiated onto an object to be measured 100' at the far side of a virtual transparent glass plate having a thickness of 2v through the virtual transparent glass plate, as indicated by arrows L1 and L3 in FIG. 15, letting v be the thickness of the mirror 300 (precisely, the thickness of the transparent glass plate 302).

Similarly, light bending properties in a case where the light flux reflected from the object to be measured 100 is reflected on the mirror 300 and is incident on the CCD camera 12 are equivalent to bending properties in a case where light is irradiated onto the CCD camera at the far side of the virtual transparent glass plate having a thickness of 2v through the virtual transparent glass plate, letting v be the thickness of the mirror 300 (precisely, the thickness of the transparent glass plate 302).

[B-4] Description of Correcting Method, Considering Effect of Bending

Description is now made of a correcting method, considering the effect of bending.

Figure 16:
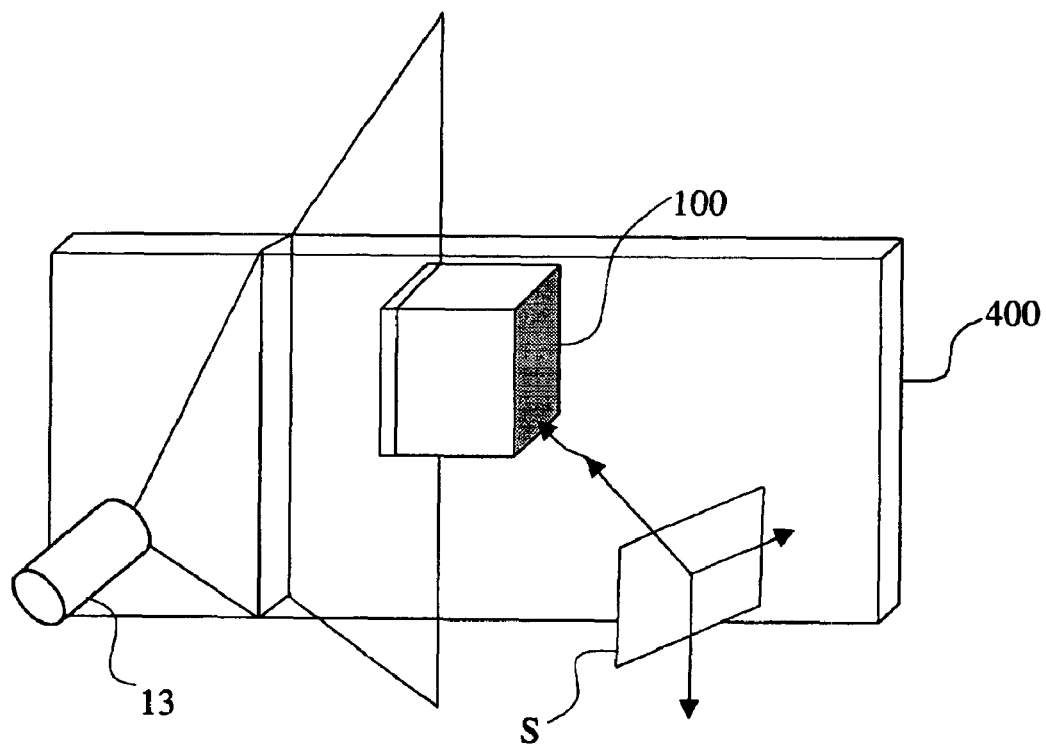
FIG. 16 is a schematic view for explaining a correcting method in a case where a slit light source and an image surface of a CCD camera are positioned on this side of a transparent glass plate, and an object to be measured is positioned at the far side of the transparent glass plate.

In order to simplify the description, description is made of a correcting method in a case where the slit light source 13 and the image surface S of the CCD camera are positioned on this side of the transparent glass plate 400 having a thickness of w, and the object to be measured 100 is positioned at the far side of the transparent glass plate 400, as shown in FIG. 16. Description is added with respect to the difference from the correcting method in a case where the mirror 300 is placed on the measuring stand 201, as shown in FIG. 15.

Figure 17:
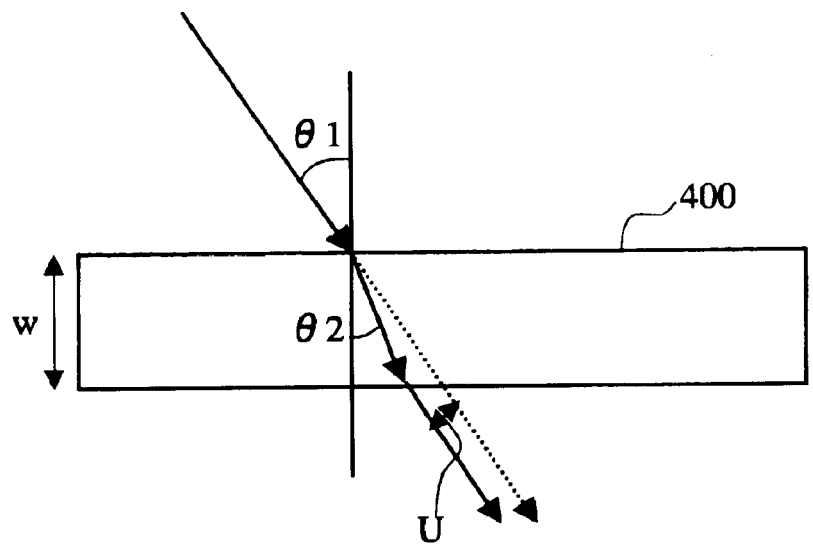
FIG. 17 is a schematic view for explaining a method of correcting an equation expressing a light flux in a case where an object to be measured is irradiated therewith.
Figure 18:
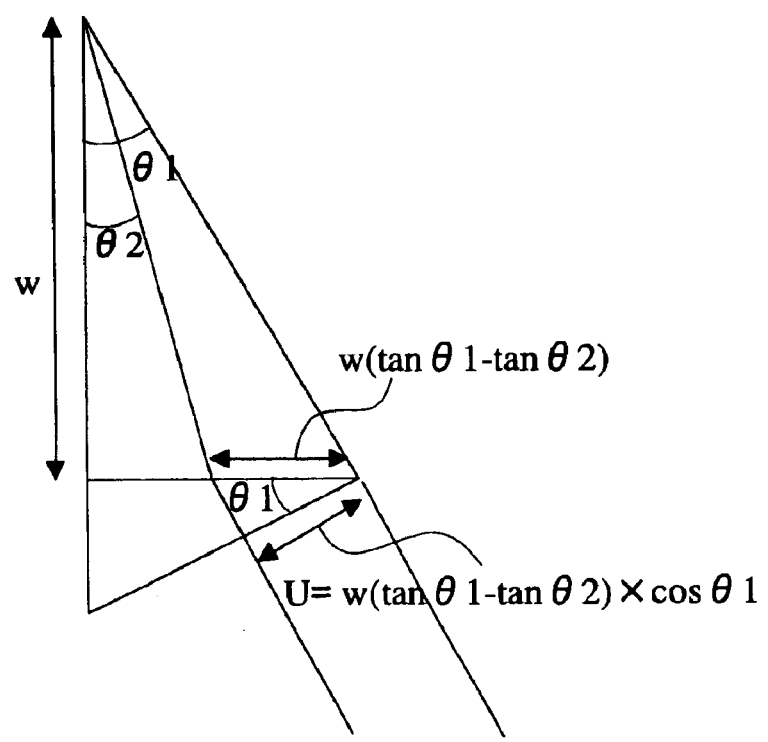
FIG. 18 is a schematic view for explaining a method of calculating the distance R between a plane representing a light flux outputted from a transparent glass plate and a plane representing the original light flux incident on the transparent glass plate.

[B-4-1] Description of Method of Correcting Equation $a_L x+b_L y+c_L z+d_L=0$ Expressing Light Flux in Case Where Object to be Measured 100 is Irradiated therewith Description is first made of a method of correcting an equation $a_L x+b_L y+c_L z+d_L=0$ expressing a light flux in a case where the object to be measured 100 is irradiated therewith on the basis of FIGS. 16 and 17.

(1) An equation $a_L x+b_L y+c_L z+d_L=0$, in the camera coordinate system, expressing a plane representing a light flux which is found by the configuration of the measuring head 10 is first converted into $a_L' X+b_L' Y+c_L' Z+d_L'=0$ expressing an equation in the world coordinate system.

(2) An angle (an angle of incidence) θ1 made between the plane representing the light flux and the transparent glass plate 400 is then found on the basis of the equation ($a_L' X+b_L' Y+c_L' Z+d_L'=0$), in the world coordinate system, expressing the plane representing the light flux and the equation ($a_M' X+b_M' Y+c_M' Z+d_M'=0$), in the world coordinate system, expressing the plane representing the transparent glass plate 400, to find θ2 in FIG. 17 from the Snell's law.

When the mirror 300 is placed on the measuring stand 201, as shown in FIG. 15, the equation ($a_M'X+b_M'Y+c_M'Z+d_M'=0$) expressing the plane representing the transparent glass plate 400 is replaced with an equation expressing the surface of the measuring stand 201 on which the mirror 300 is placed.

Letting n1 be the refractive index of air and n2 be the refractive index of the transparent glass plate 400, the relationship between θ1 and θ2 is expressed by the following equation (4) from the Snell's law.

$$n1 \times \sin\theta1 = n2 \times \sin\theta2 \quad (4)$$

(3) An equation ($a_L''X+b_L''Y+c_L''Z+d_L''=0$), in the world coordinate system, expressing the plane representing the light flux after bending is then found.

The distance U between the plane representing the light flux outputted from the transparent glass plate 400 and the plane representing the original light flux incident on the transparent glass plate 400 is expressed by the following equation (5) from FIG. 17.

$$U = w(\tan\theta1 - \tan\theta2) \times \cos\theta1 \quad (5)$$

When the mirror 300 is placed on the measuring stand 201, as shown in FIG. 15, w in the foregoing equation 5 is 2v, letting v be the thickness of the transparent glass plate 302 in the mirror 300.

The plane representing the light flux after bending in the world coordinate system is a plane parallel to the plane ($a_L'X+b_L'Y+c_L'Z+d_L'=0$) representing the original light flux incident on the transparent glass plate 400 and spaced U apart therefrom. Consequently, the equation ($a_L''X+b_L''Y+c_L''Z+d_L''=0$), in the world coordinate system, expressing the plane representing the light flux after bending is found by the following equation (6):

$$a_L''X+b_L''Y+c_L''Z+d_L''=a_L'X+b_L'Y+c_L'Z+d_L'+(\sqrt{a_L'^2+b_L'^2+c_L'^2} \times U) \quad (6)$$

(4) The equation $a_L''X+b_L''Y+c_L''Z+d_L''$, in the world coordinate system, expressing the plane representing the light flux after bending is converted into an equation ($a_L'''X+b_L'''Y+c_L'''Z+d_L'''$), in the camera coordinate system, expressing the plane using the rotation R and the translation t of camera coordinates found in the first step.

An equation ($a_1'''X+b_1'''Y+c_1'''Z+d_1'''$), in the camera coordinate system, expressing the plane representing the light flux after bending which is thus found is used as an equation expressing the plane representing the light flux used in the foregoing third step.

[B-4-2] Description of Method of Correcting (xs, ys) in Coordinates of Measuring Point (Coordinates of Observing Point) (xs, ys, f) on Image Surface S of CCD Camera 12

Description is made of a method of correcting (xs, ys) in the coordinates of a measuring point (the coordinates of an observing point) (xs, ys, f) on the image surface S of the CCD camera 12. The method includes two methods.

The first method is a method of correcting (xs, ys) in the coordinates (xs, ys, f) of the measuring point on the image surface S, assuming that light reflected from the object to be measured 100 (hereinafter referred to as reflected light) is all perpendicularly incident on the image surface S of the CCD camera 12.

The second method is a method of correcting (xs, ys) in the coordinates (xs, ys, f) of the measuring point on the image surface S, assuming that light reflected from the object to be measured 100 (hereinafter referred to as reflected light) is incident on the CCD camera 12 toward the position of the focus of the CCD camera 12 (an origin of camera coordinates).

[B-4-2-1] Description of First Method

Figure 19:
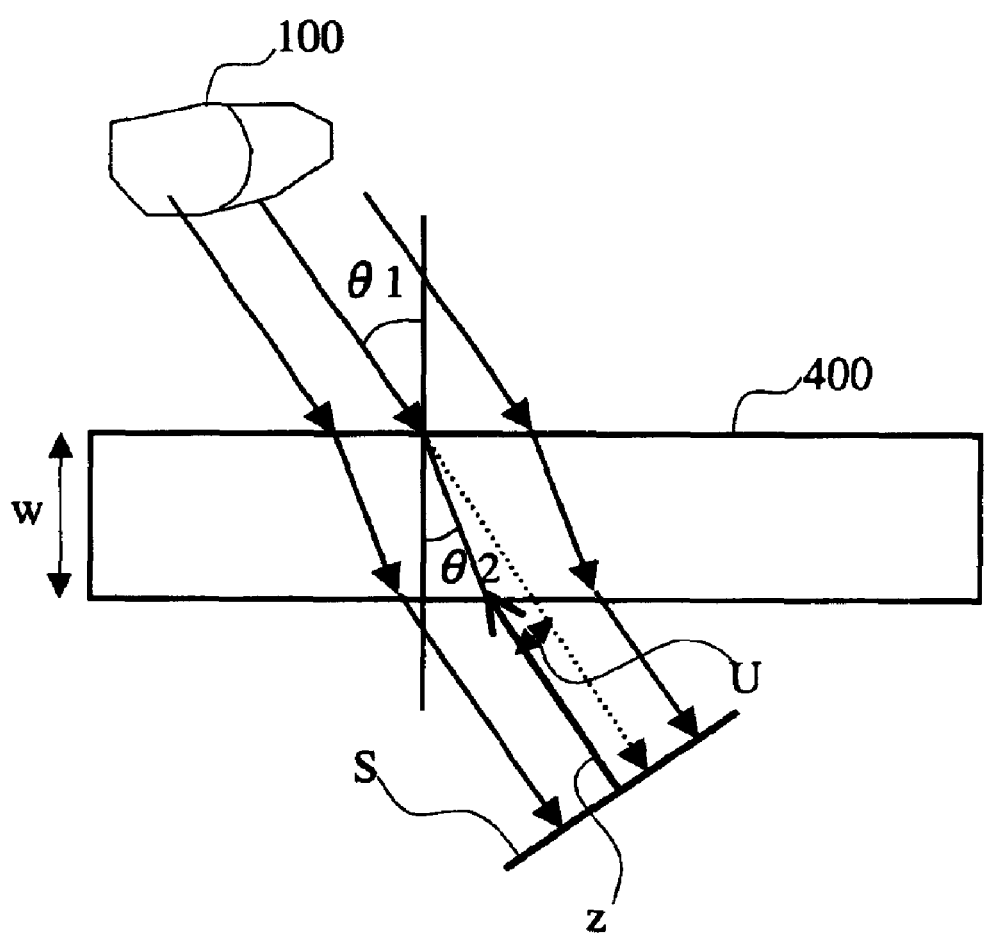
FIG. 19 is a schematic view for explaining a first method of correcting the coordinates of a measuring point on an image surface S.

The first method will be first described on the basis of FIGS. 16 and 19.

In the first method, it is assumed that light reflected from the object to be measured 100 (hereinafter referred to as reflected light) is all perpendicularly incident on the image surface S of the CCD camera 12.

(1) A linear equation, in the camera coordinate system, expressing an optical axis (a z-axis) of the CCD camera 12 is first converted into an equation in the world coordinate system using the rotation R and the translation t of the camera coordinates found in the first step.

(2) An angle (an angle of incidence) θ1 made between the transparent glass plate 400 and the optical axis (the z-axis) of the CCD camera 12 is found on the basis of the linear equation, in the world coordinate system, expressing the optical axis (the z-axis) and the equation ($a_M'X+b_M'Y+c_M'Z+d_M'=0$), in the world coordinate system, expressing the transparent glass plate 400, to find θ2 in FIG. 19 from the Snell's law.

When the mirror 300 is placed on the measuring stand 201, as shown in FIG. 15, the equation ($a_M'X+b_M'Y+c_M'Z+d_M'=0$) expressing the plane representing the transparent glass plate 400 is replaced with an equation expressing the surface of the measuring stand 201 on which the mirror 300 is placed.

(3) The distance U (=w ×(tanθ1−tanθ2)×cos θ1) between the plane representing the light flux outputted from the transparent glass plate 400 and the plane representing the original light flux incident on the transparent glass plate 400 is found using the foregoing equation 5.

When the mirror 300 is placed on the measuring stand 201, as shown in FIG. 15, w in the foregoing equation 5 is 2v, letting v be the thickness of the transparent glass plate 302 in the mirror 300.

Figure 20:
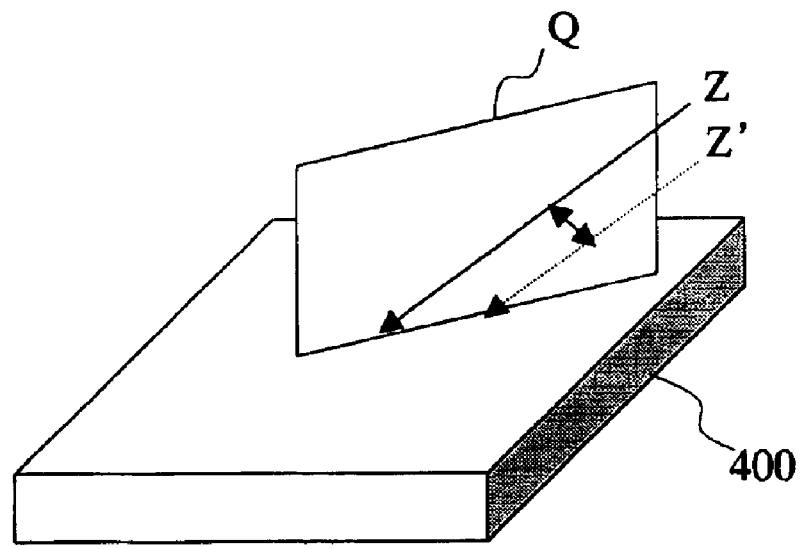
FIG. 20 is a schematic view showing a plane Q including an optical axis (a z-axis) and perpendicular to a transparent glass plate.

(4) An equation expressing a plane Q including the optical axis (the z-axis) and perpendicular to the transparent glass plate 400 is then found on the basis of the linear equation, in the world coordinate system, expressing the optical axis (the z-axis) of the CCD camera 12 and the equation, in the world coordinate system, expressing the plane representing the transparent glass plate 400, as shown in FIG. 20.

(5) The equation, in the world coordinate system, expressing the plane including the optical axis (the z-axis) and perpendicular to the transparent glass plate 400 is converted into an equation in the camera coordinate system using the rotation R and the translation t of the camera coordinates found in the first step.

Figure 21:
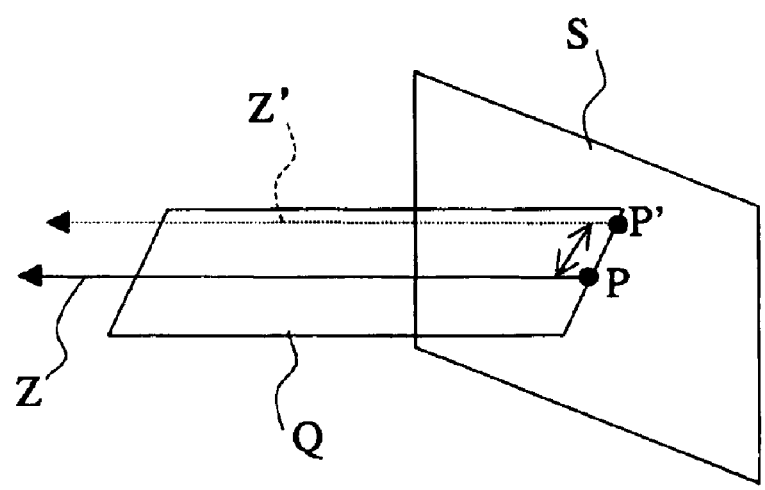
FIG. 21 is a schematic view showing a line of intersection between a plane Q including an optical axis and perpendicular to a transparent glass plate and an image surface.

(6) An equation expressing a line of intersection between the plane Q including the optical axis and perpendicular to the transparent glass plate 400 and the image surface S is then found on the basis of the equation, in the camera coordinate system, expressing the plane Q including the optical axis and perpendicular to the transparent glass plate 400 and the equation, in the camera coordinate system, expressing the image surface S, as shown in FIG. 21.

(7) The coordinates (x1, y1) of a position P′ shifted by the distance U from the position P crossing the z-axis on the image surface S on the line of intersection between the plane Q including the optical axis and perpendicular to the transparent glass plate 400 and the image surface S are found on the basis of the equation expressing the line of intersection between the plane Q and the image surface S. The found coordinate value (x1, y1) is a correction value.

Figure 22:
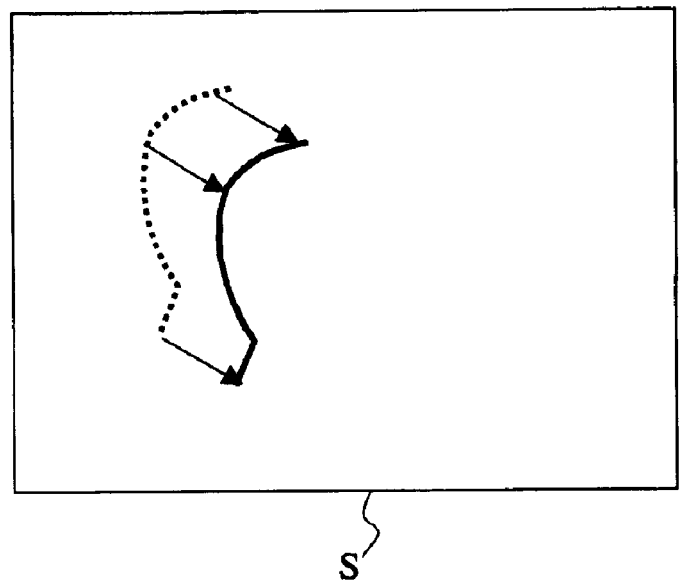
FIG. 22 is a schematic view showing an example of a case where an image observed on an image surface is corrected.

(8) The coordinates (xs, ys, f) of an observing point corresponding to the measuring point on the image surface S used in the foregoing third step are corrected using the correction value (x1, y1). When coordinates after the correction corresponding to the coordinates (xs, ys, f) of the observing point corresponding to the measuring point on the image surface S are taken as (xs', ys', f), xs' and ys' are expressed by the following equation (7). FIG. 22 shows an example in a case where an image observed on the image surface S is corrected. In FIG. 22, a broken line indicates the image observed on the image surface S, and a solid line indicates the image after the correction.

$$xs'=xs+x1$$
$$ys'=ys+y1 \quad (7)$$

[B-4-2-2] Description of Second Method

The second method will be described on the basis of FIGS. 16 and 23.

In the second method, it is assumed that light reflected from the object to be measured 100 (hereinafter referred to as reflected light) is incident on the CCD camera 12 toward the position of the focus of the CCD camera 12 (an origin of camera coordinates).

(1) The coordinates of an observing point on the image surface S are extracted. An equation expressing a straight line L passing through the observing point from the origin of the camera coordinates is found in the camera coordinate system.

(2) The equation, found in the camera coordinate system, expressing the straight line L is converted into an equation in the world coordinate system using the rotation R and the translation t of the camera coordinates found in the first step.

Figure 23:
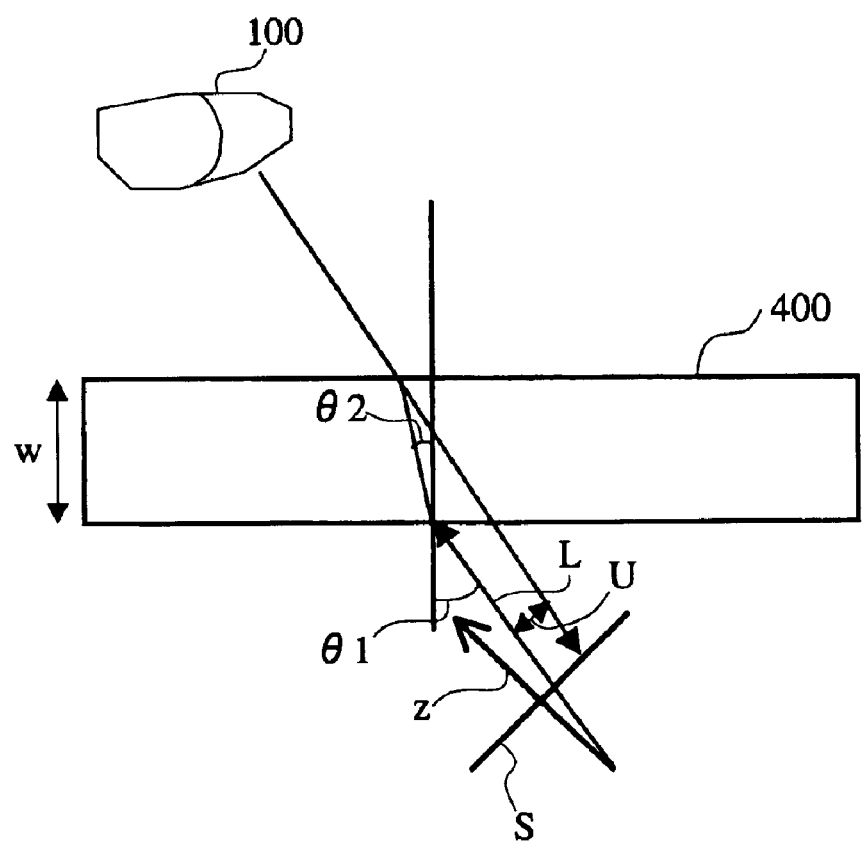
FIG. 23 is a schematic view for explaining a second method of correcting the coordinates of a measuring point on an image surface S.

(3) An angle (an angle of incidence) θ1 made between the transparent glass plate 400 and the optical axis (the z-axis) of the CCD camera 12 is found on the basis of the equation, in the world coordinate system, expressing the straight line L and the equation ($a_M'X+b_M'Y+c_M'Z+d_M'=0$), in the world coordinate system, expressing the transparent glass plate 400, to find θ2 in FIG. 23 from the Snell's law.

When the mirror 300 is placed on the measuring stand 201, as shown in FIG. 15, the equation ($a_M'X+b_M'Y+c_M'Z+d_M'=0$) expressing the plane representing the transparent glass plate 400 is replaced with an equation expressing the surface of the measuring stand 201 on which the mirror 300 is placed.

(4) The distance U (=W×(tanθ1−tanθ2)×cosθ1) between the plane representing the reflected light outputted from the transparent glass plate 400 and the plane representing the original reflected light incident on the transparent glass plate 400 is then found using the foregoing equation 5.

When the mirror 300 is placed on the measuring stand 201, as shown in FIG. 15, w in the foregoing equation 5 is 2v, letting v be the thickness of the transparent glass plate 302 in the mirror 300.

Figure 24:
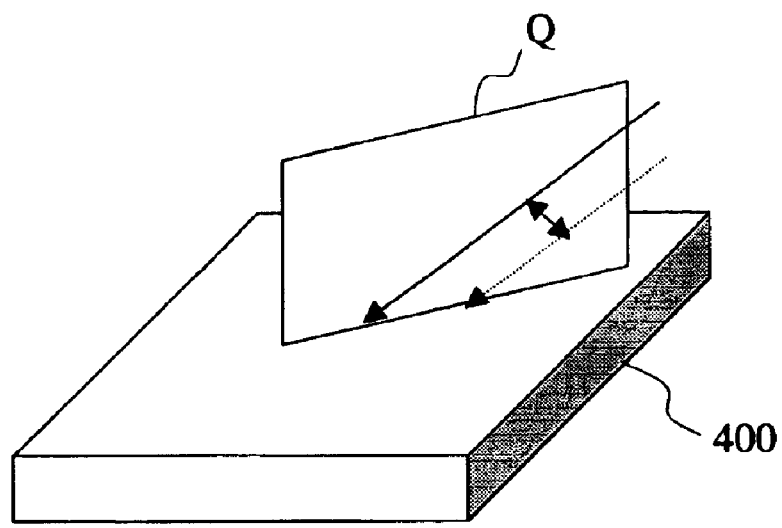
FIG. 24 is a schematic view showing a plane Q including a straight line L shown in FIG. 23 and perpendicular to a transparent glass plate 400.

(5) An equation expressing a plane Q including the straight line L and perpendicular to the transparent glass plate 400 is then found on the basis of the equation, in the world coordinate system, expressing the straight line L and the equation, in the world coordinate system, expressing the plane representing the transparent glass plate 400, as shown in FIG. 24.

When the mirror 300 is placed on the measuring stand 201, as shown in FIG. 15, the equation ($a_M'X+b_M'Y+c_M'Z+d_M'=0$) expressing the plane representing the transparent glass plate 400 is replaced with an equation expressing the surface of the measuring plate 201 on which the mirror 300 is placed.

(6) The equation, in the world coordinate system, expressing the plane Q including the straight line L and perpendicular to the transparent glass plate 400 is converted into an equation in the camera coordinate system using the rotation R and the translation t of the camera coordinates found in the first step.

Figure 25:
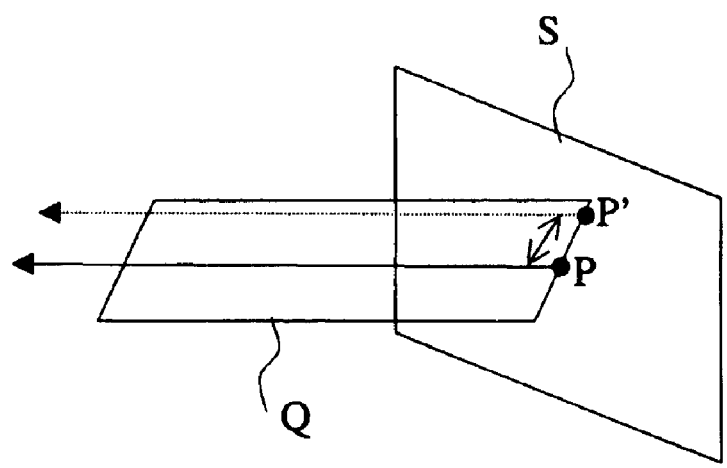
FIG. 25 is a schematic view showing a line of intersection between a plane Q including a straight line L shown in FIG. 23 and perpendicular to a transparent glass plate and an image surface.

(7) An equation expressing a line of intersection of the plane Q including the straight line L and perpendicular to the transparent glass plate 400 and the image surface S is then found on the basis of the equation, in the camera coordinate system, expressing the plane Q including the straight line L and perpendicular to the transparent glass plate 400 and the equation, in the camera coordinate system, expressing the image surface S, as shown in FIG. 25.

(8) The equation expressing the line of intersection between the plane Q including the straight line L and perpendicular to the transparent glass plate 400 and the image surface S is found on the equation expressing the plane Q and the equation, in the camera coordinate system, expressing the image surface S.

(b 9) The coordinates (xs', ys', f) of a position P' shifted by the distance U from the position P crossing the straight line L on the image surface S are found. The found coordinates (xs', ys', f) are coordinates obtained by correcting the coordinates (xs, ys, f) of the observing point.

What is claimed is:

1. A shape measuring device comprising a measuring head for measuring the shape of an object to be measured which is placed on a measuring stand, position detection means for detecting the position of the measuring head, and operation means for finding a three-dimensional shape of the object to be measured on the basis of outputs of the measuring head and the position detection means, characterized in that a mirror for reflecting the object to be measured is disposed on the measuring stand, wherein the position detection means detects the position of the measuring head by a stereo method using two cameras;

the measuring head comprises light irradiation means for irradiating the object to be measured with a light flux, and imaging means for imaging a measuring point on the object to be measured which is irradiated with the light flux from the light irradiation means, to pick up a real image of the object to be measured and a virtual image of the object to be measured which is reflected on the mirror;

the mirror has a light reflective surface formed on its surface; and the operation means comprises first means for finding the coordinates in a measuring head coordinate system of each of the measuring points on the basis of the coordinates of the measuring point on an imaging screen of the imaging means and an equation expressing a plane representing the light flux emitted from the light irradiation means, second means for converting the coordinates of each of the measuring points which are found by the first means into coordinates in a world coordinate system on the basis of the results of the detection by the position detection means, to find a three-dimensional shape corresponding to the real image of the object to be measured and a three-dimensional shape corresponding to the virtual image of the object to be measured which is reflected on the mirror, third means for finding an equation, in the world coordinate system, expressing a light reflective surface of the mirror, fourth means for finding a three-dimensional shape which is symmetrical to the three-dimensional shape corresponding to the virtual image about the light reflective surface on the basis of the equation expressing the light reflective surface of the mirror, and fifth means for synthesizing the three-dimensional shape which is symmetrical to the three-dimensional shape corresponding to the virtual image about the light reflective surface and the three-dimensional shape corresponding to the real image of the object to be measured, to find a three-dimensional shape of the object to be measured.

2. The shape measuring device according to claim 1, characterized in that means for finding the equation expressing the light reflective surface of the mirror comprises means for measuring the coordinates of three or more points on the light reflective surface by a stereo method using two cameras, and means for finding an equation expressing the light reflective surface on the basis of the obtained coordinates of the three or more points on the light reflective surface.

3. The shape measuring device according to claim 1, characterized in that means for finding the equation expressing the light reflective surface of the mirror comprises means for imaging an opaque thin plate using the measuring head in a state where the thin plate is placed on the light reflective surface, to extract coordinates in the measuring head coordinate system of three or more points for specifying a plane of the thin plate, means for converting the obtained coordinates in the measuring head coordinate system of the three or more points into coordinates in the world coordinate system on the basis of the results of the detection by the position detection means, and means for finding an equation, in the world coordinate system, expressing the plane of the thin plate on the basis of the obtained coordinates in the world coordinate system of the three or more points.

4. The shape measuring device according to claim 1, characterized by comprising guide means for regulating the posture of the measuring head such that the light flux irradiated from the light irradiation means in the measuring head is perpendicularly emitted to the light reflective surface of the mirror.

5. The shape measuring device according to claim 1, characterized in that the guide means regulates a moving path of the measuring head.

6. The shape measuring device according to claim 5, characterized by comprising driving means for moving the measuring head along the guide means.

7. The shape measuring device according to claim 6, characterized by comprising a case covering the whole of the moving path of the measuring head.

8. The shape measuring device according to claim 7, wherein the case comprises an opening into and from which the object to be measured is to be inserted and extracted.

9. The shape measuring device according to claim 8, characterized in that a cover composed of an elastic member is provided in the opening of the case, the cover comprising a notch into and from which the object to be measured is to be inserted and extracted.

10. A shape measuring device comprising a measuring head for measuring the shape of an object to be measured which is placed on a measuring stand, position detection means for detecting the position of the measuring head, and operation means for finding a three-dimensional shape of the object to be measured on the basis of outputs of the measuring head and the position detection means, characterized in that a mirror for reflecting the object to be measured is disposed on the measuring stand, wherein the position detection means detects the position of the measuring head by a stereo method using two cameras;

the measuring head comprises light irradiation means for irradiating the object to be measured with a light flux, and imaging means for imaging a measuring point on the object to be measured which is irradiated with the light flux from the light irradiation means, to pick up a real image of the object to be measured and a virtual image of the object to be measured which is reflected on the mirror;

the mirror comprises a light reflecting plate having a light reflective surface formed on its surface and a transparent plate formed on the light reflecting plate; and the operation means comprises first means for finding, with respect to a measuring point on the real image of the object to be measured, the coordinates in the measuring head coordinate system of the measuring point on the basis of the coordinates of the measuring point on the imaging screen of the imaging means and the equation expressing the plane representing the light flux emitted from the light irradiation means, second means for finding, with respect to a measuring point on the virtual image of the object to be measured which is reflected on the mirror, the coordinates in the measuring head coordinate system of the measuring point on the basis of a coordinate value obtained by correcting the coordinate value of the measuring point on the imaging screen of the imaging means in consideration of the amount of refraction of the transparent plate in the mirror and an equation obtained by correcting the equation expressing the plane representing the light flux emitted from the light irradiation means in consideration of the amount of refraction of the transparent plate in the mirror, third means for converting the coordinates of each of the measuring points which are found by the first means and the second means into coordinates in the world coordinate system on the basis of the results of the detection by the position detection means, to find a three-dimensional shape corresponding to the real image of the object to the measured and a three-dimensional shape corresponding to the virtual image of the object to be measured which is reflected on the mirror, fourth means for finding an equation, in the world coordinate system, expressing the light reflective surface of the mirror, fifth means for finding a three-dimensional shape which is symmetrical to the three-dimensional shape corresponding to the virtual image about the light reflective surface on the basis of the equation expressing the light reflective surface of the mirror, and sixth means for synthesizing the three-dimensional shape which is symmetrical to the three-dimensional shape corresponding to the virtual image about the light reflective surface and the three-dimensional shape corresponding to the real image of the object to be measured, to find a three-dimensional shape of the object to be measured.

11. The shape measuring device according to claim 10, characterized in that means for finding an equation expressing the light reflective surface of the mirror comprises means for measuring the coordinates of three or more points on the measuring stand on which the mirror is placed by a stereo method using two cameras, and means for finding the equation expressing the light reflective surface on the basis of the obtained coordinates of the three or more points on the measuring stand.

12. The shape measuring device according to claim 10, characterized by comprising guide means for regulating the posture of the measuring head such that the light flux irradiated from the light irradiation means in the measuring head is perpendicularly emitted to the light reflective surface of the mirror.

* * * * *